(12) United States Patent
Anderson et al.

(10) Patent No.: US 9,990,761 B1
(45) Date of Patent: Jun. 5, 2018

(54) METHOD OF IMAGE COMPOSITING DIRECTLY FROM RAY TRACING SAMPLES

(71) Applicants: Erik Anderson, San Diego, CA (US); Mathew Fride, San Diego, CA (US)

(72) Inventors: Erik Anderson, San Diego, CA (US); Mathew Fride, San Diego, CA (US)

(73) Assignee: Go Ghost, LLC, San Diego, CA (US)

( * ) Notice: Subject to any disclaimer, the term of this patent is extended or adjusted under 35 U.S.C. 154(b) by 0 days. days.

(21) Appl. No.: 15/691,686

(22) Filed: Aug. 30, 2017

(51) Int. Cl.
| | |
|---|---|
| *G06T 15/06* | (2011.01) |
| *G06T 15/50* | (2011.01) |
| *G06T 15/00* | (2011.01) |
| *G06T 17/20* | (2006.01) |
| *G06T 15/20* | (2011.01) |
| *G06T 19/20* | (2011.01) |

(52) U.S. Cl.
CPC .......... *G06T 15/503* (2013.01); *G06T 15/005* (2013.01); *G06T 15/06* (2013.01); *G06T 15/20* (2013.01); *G06T 17/20* (2013.01); *G06T 19/20* (2013.01); *G06T 2210/36* (2013.01); *G06T 2219/2012* (2013.01)

(58) Field of Classification Search
CPC ................................ G06T 15/50; G06T 15/06
See application file for complete search history.

(56) References Cited

U.S. PATENT DOCUMENTS

| | | | |
|---|---|---|---|
| 7,477,777 B2 | 1/2009 | Wells | |
| 9,424,677 B2 | 8/2016 | Anderson | |
| 2013/0027417 A1* | 1/2013 | Merrell | ............... G06T 15/06 345/582 |
| 2014/0333623 A1* | 11/2014 | Ozdas | ................... G06T 15/08 345/426 |
| 2015/0262409 A1* | 9/2015 | Morgan | ................. G06T 15/06 345/421 |

* cited by examiner

*Primary Examiner* — Matthew Salvucci
(74) *Attorney, Agent, or Firm* — Arc IP Law, PC; Joseph J. Mayo

(57) ABSTRACT

A method of image compositing that directly manipulates ray tracing samples generated by a ray tracing renderer, rather than manipulating the pixels of a rasterized image. Rasterization may be performed after compositing at any desired resolution or resolutions, for example to adapt to different displays. Ray tracing samples may be tagged with the identity of the object intersected by the ray, facilitating object selection during compositing without the need for object masks. Random or pseudo-random ray patterns typically used by renderers may be supported directly. A large number of compositing operations may be performed directly on the ray tracing samples, including color changes, object repositioning in two dimensions or three dimensions, merging of images or objects from different scenes or rendering passes, and generation of new viewpoints for an image. Preview images may be generated during compositing using a subset of the available samples, trading off image quality for speed.

21 Claims, 21 Drawing Sheets
(16 of 21 Drawing Sheet(s) Filed in Color)

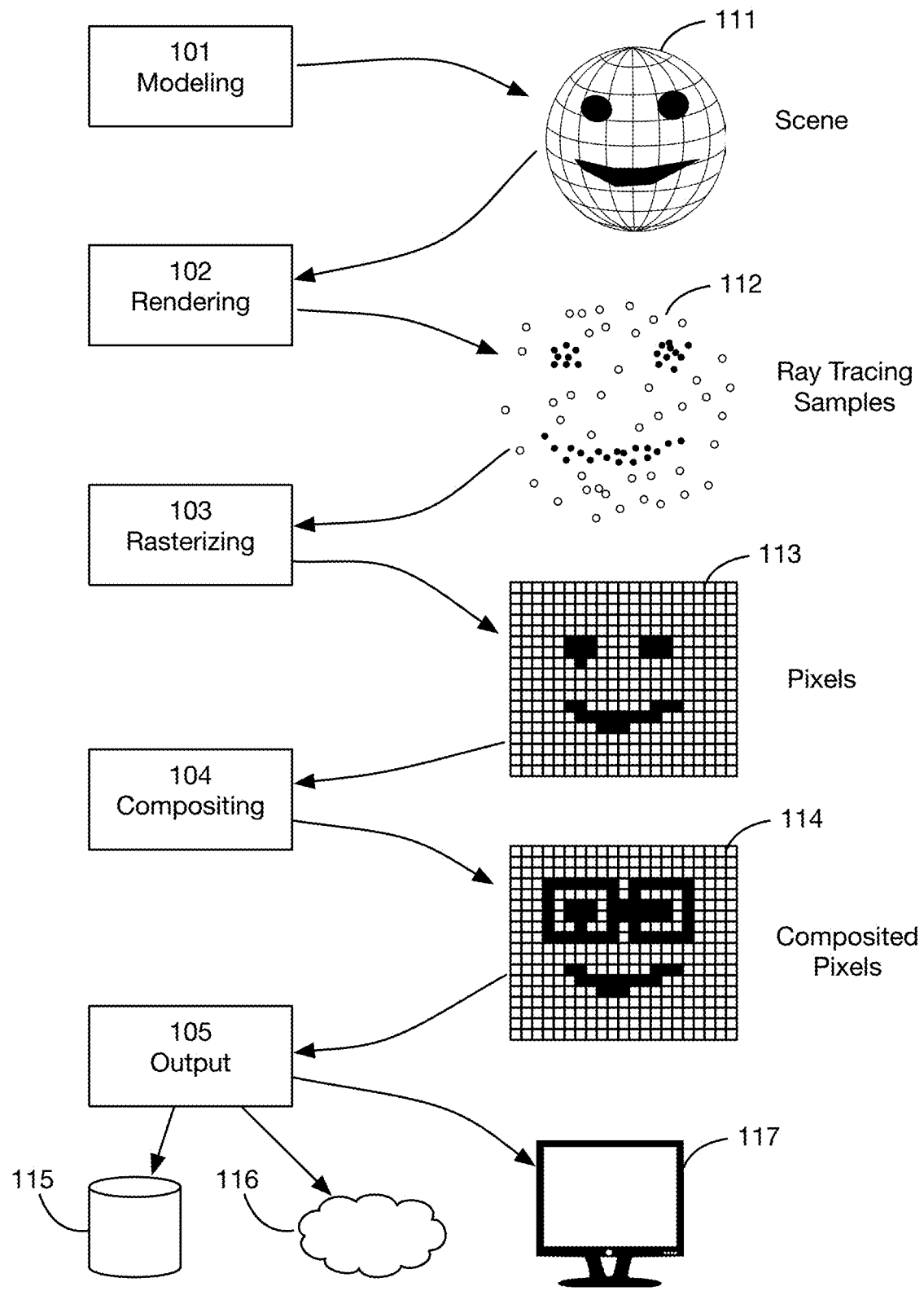

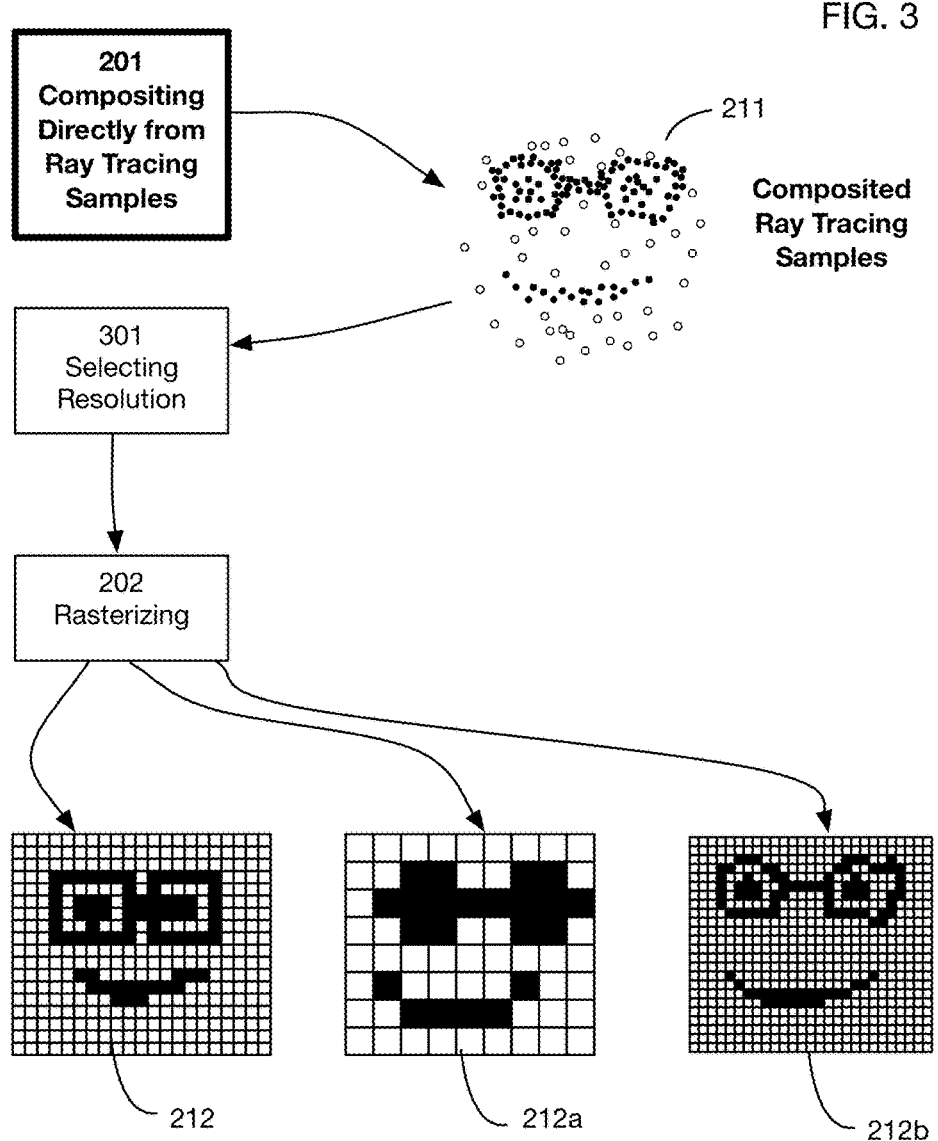

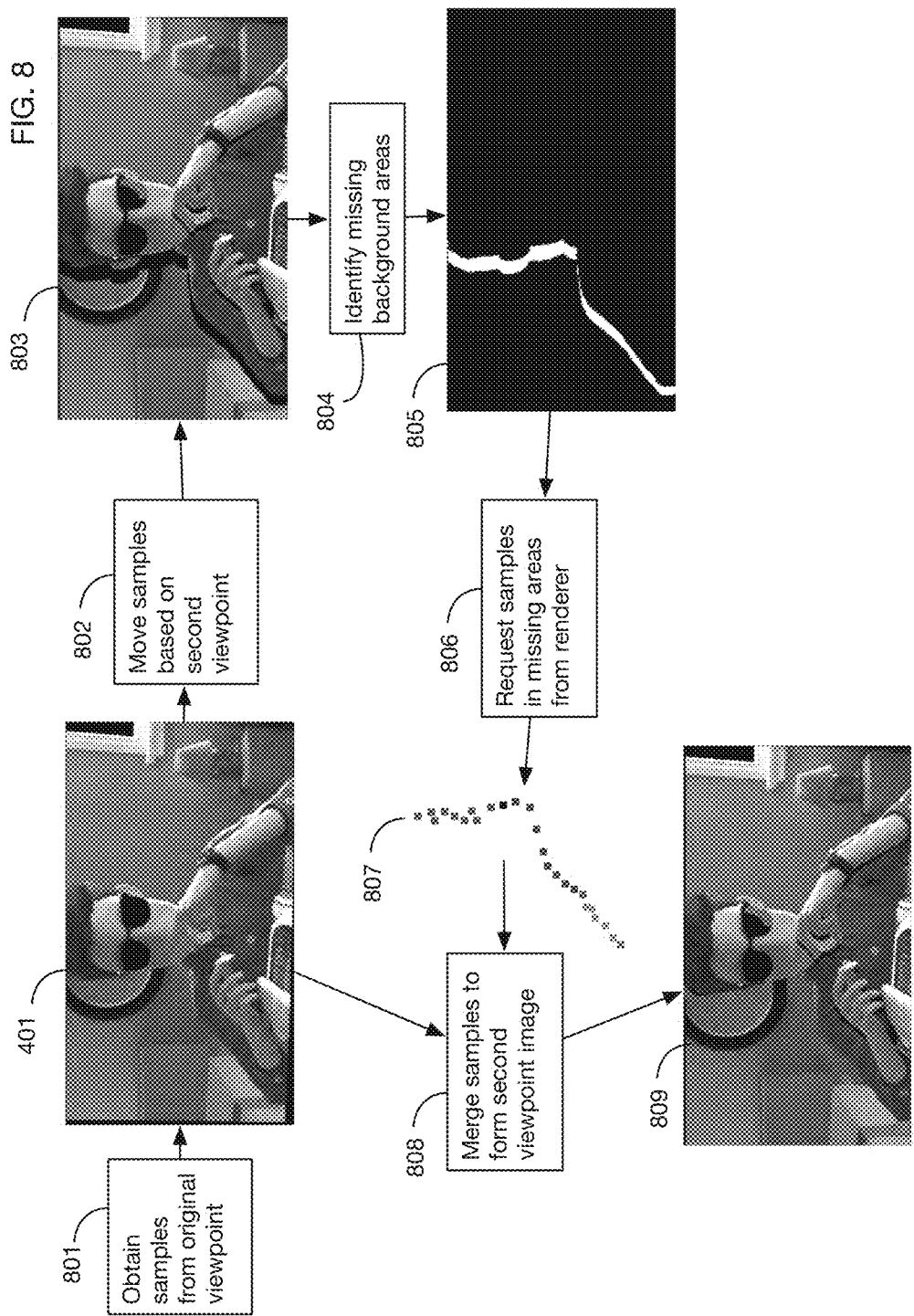

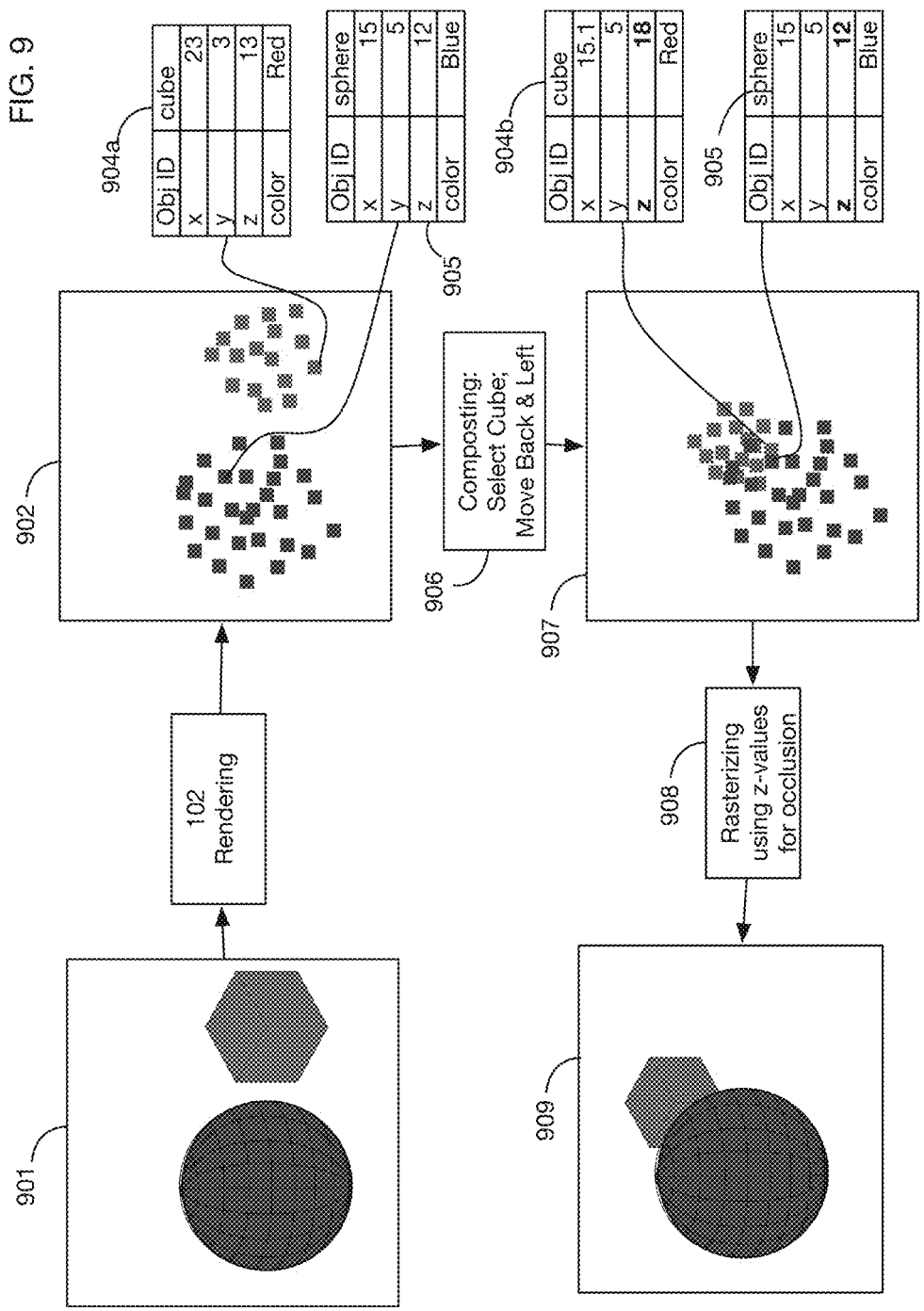

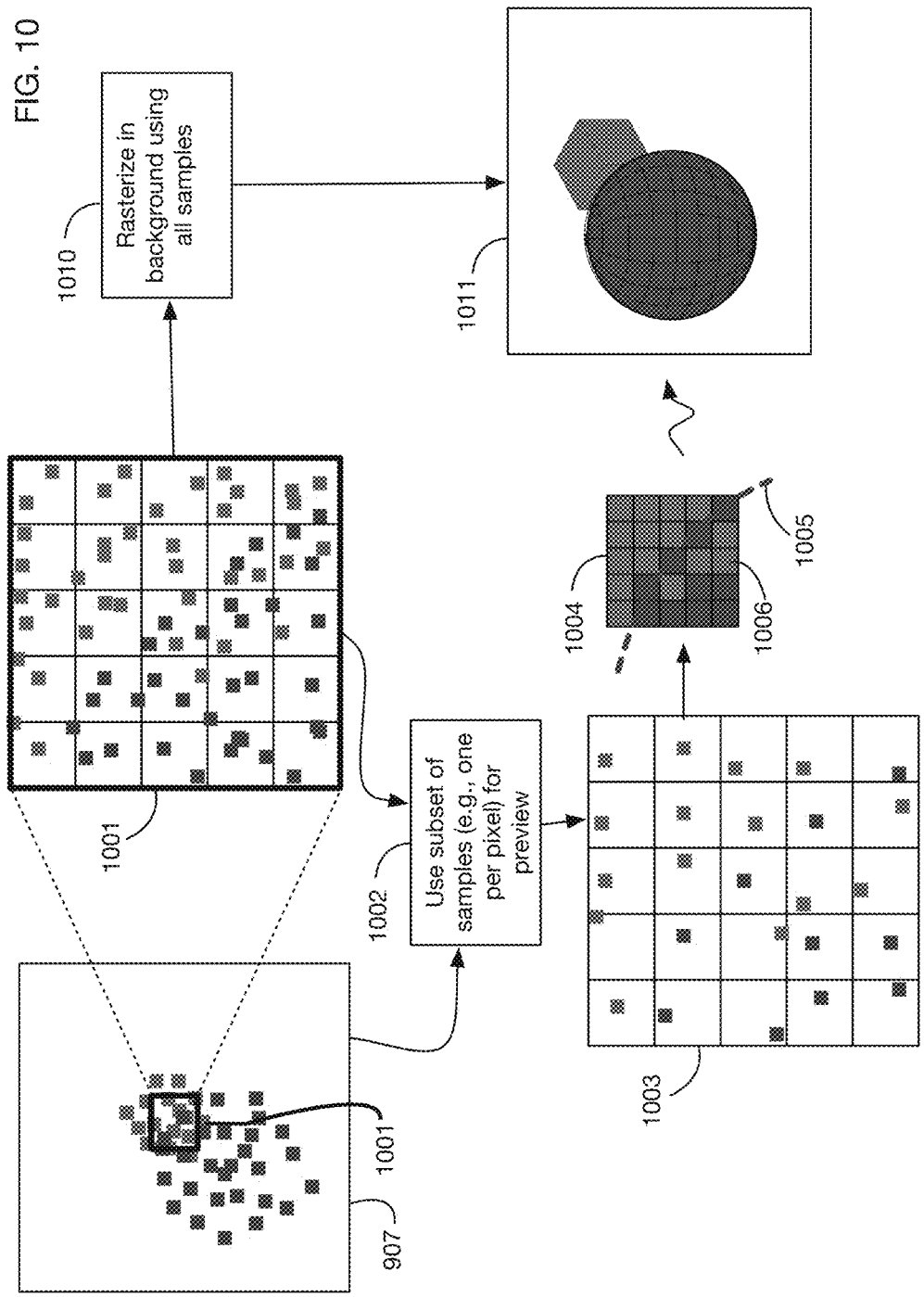

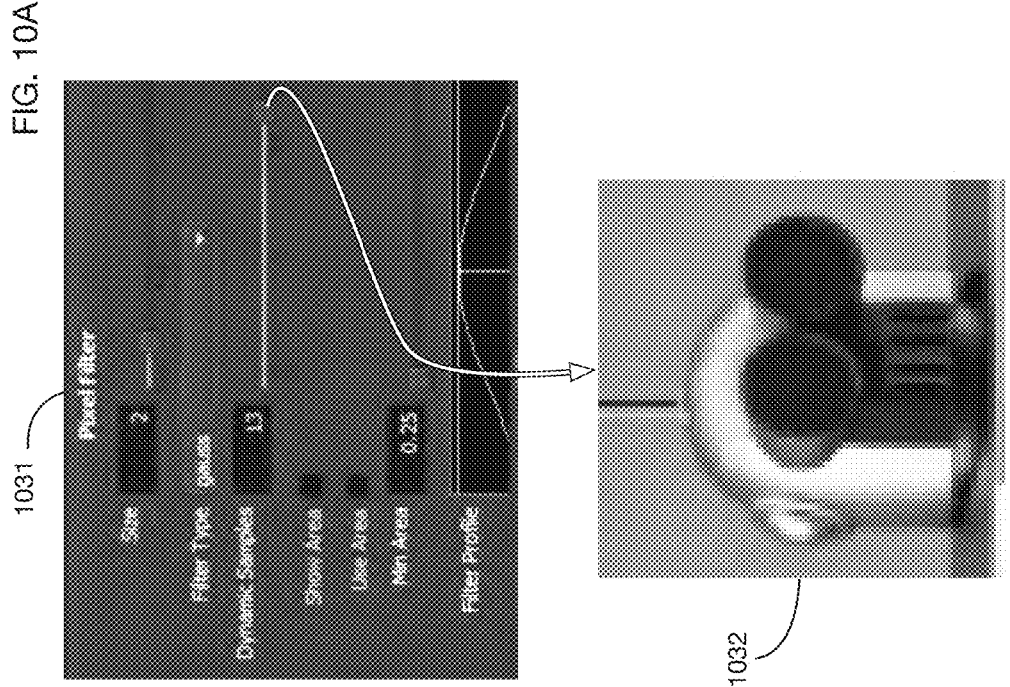
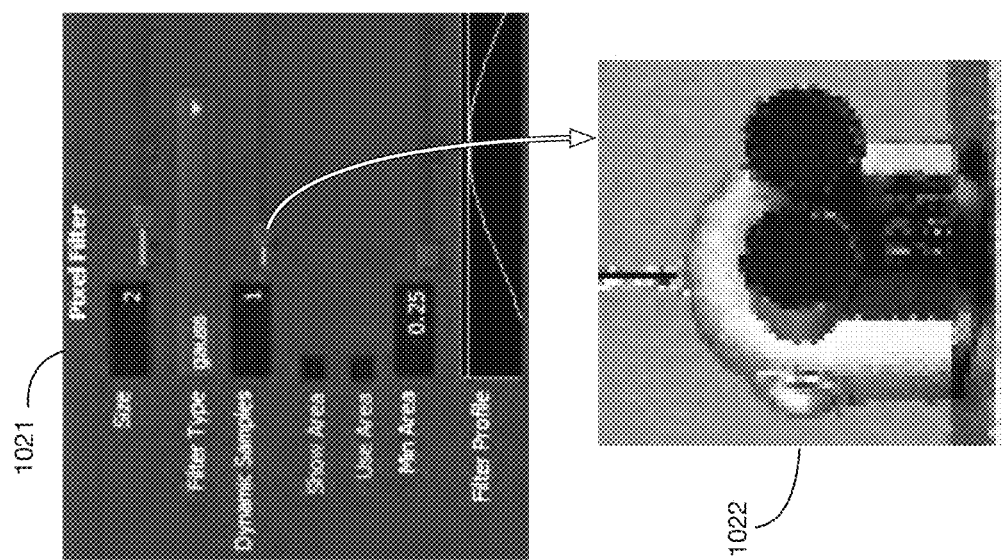
FIG. 10A

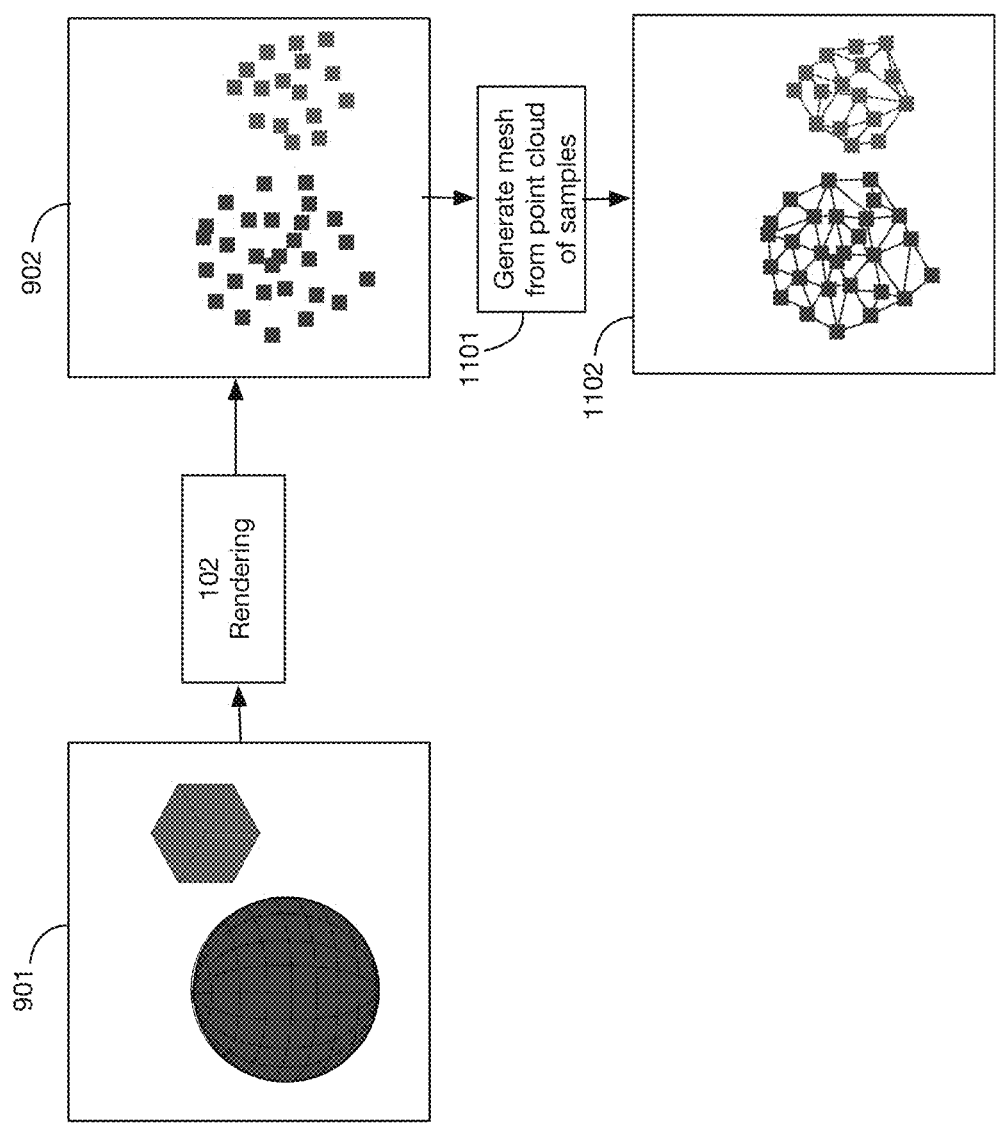

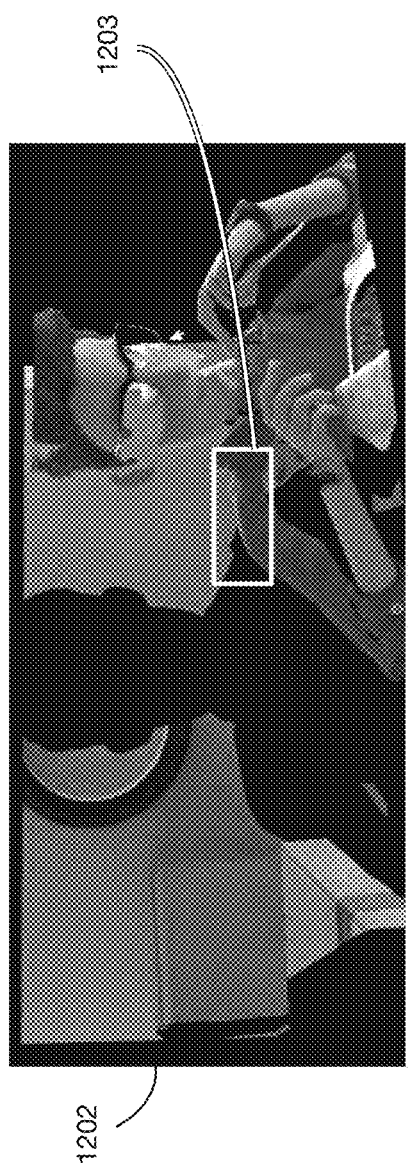
FIG. 12A

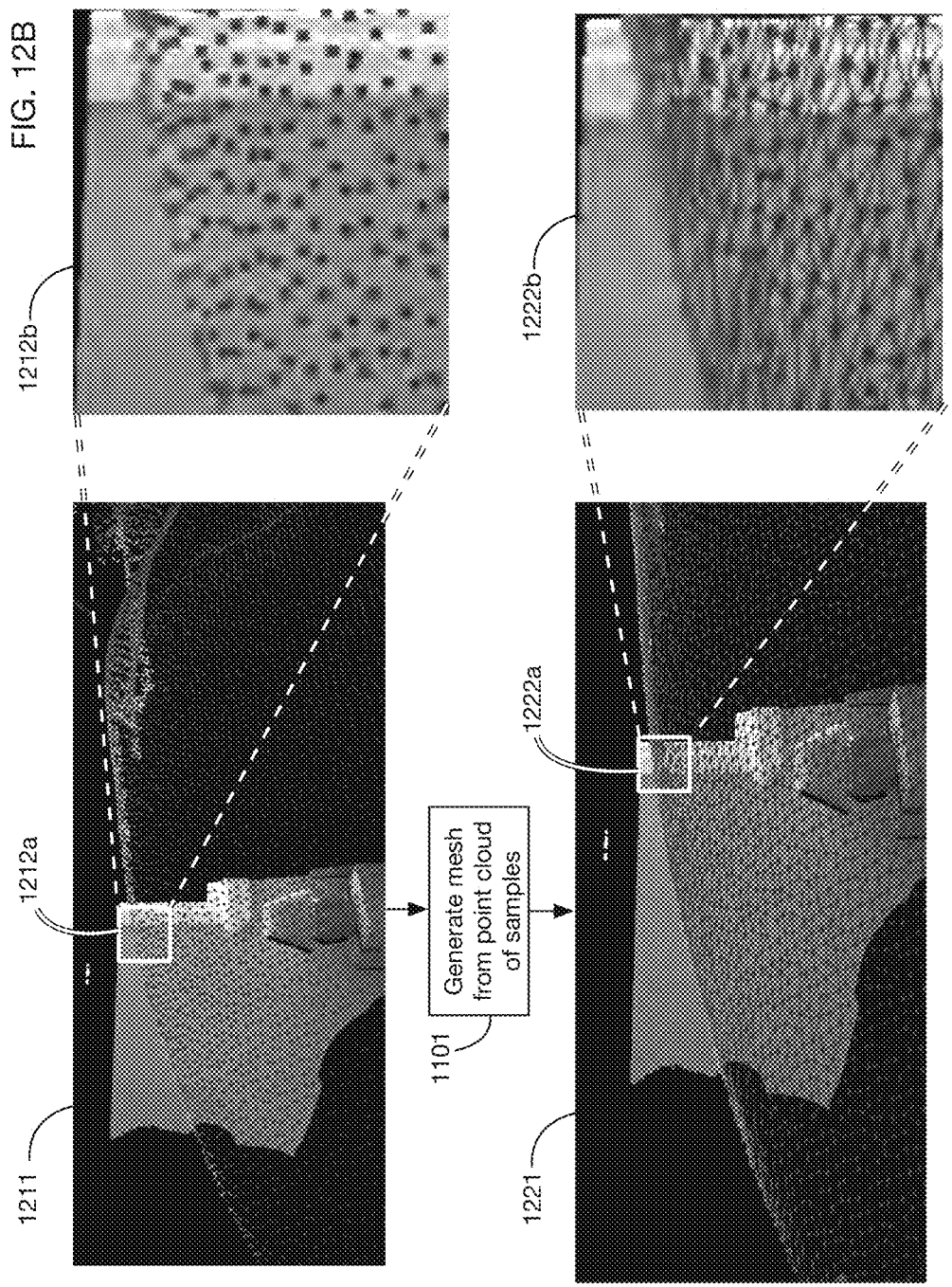

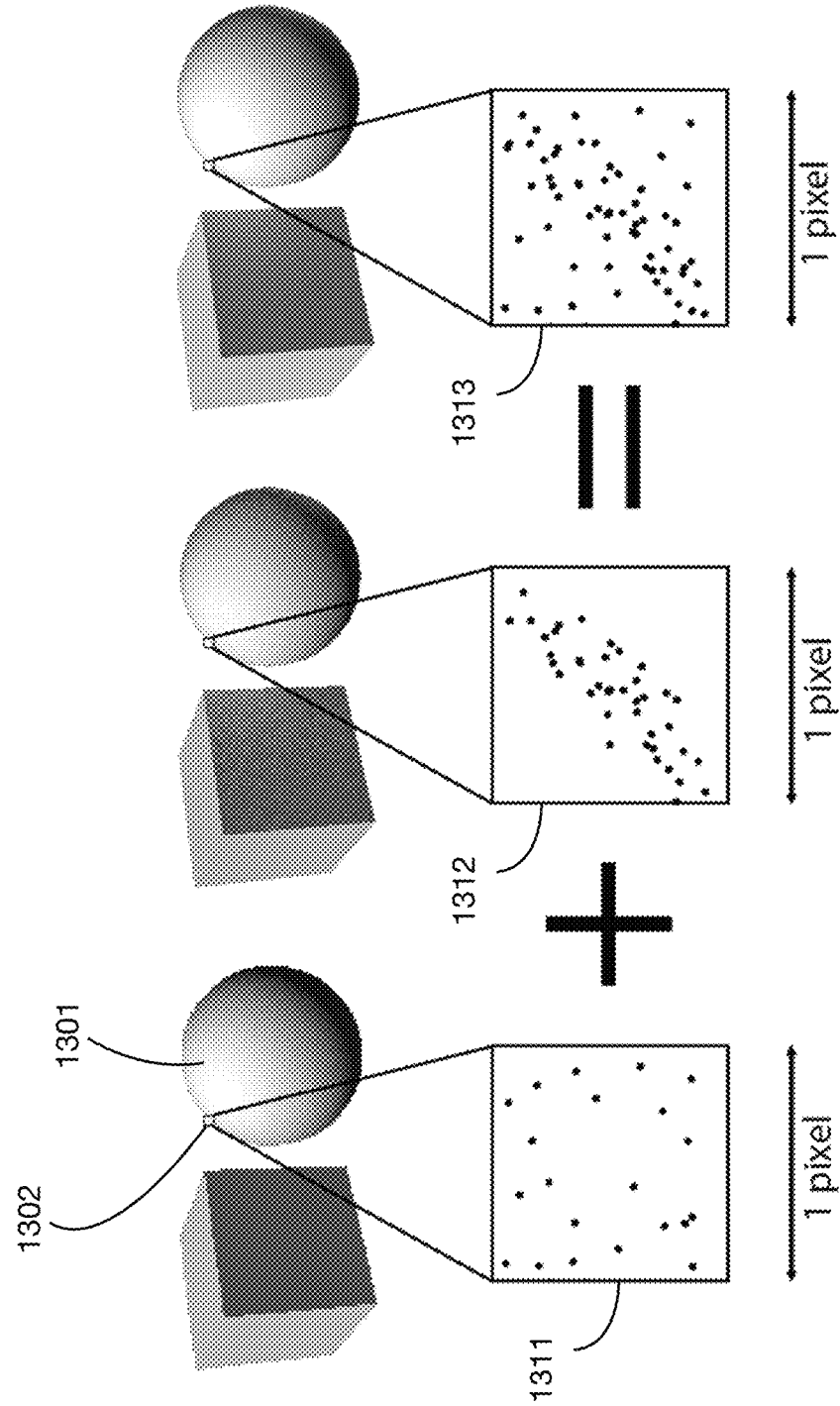

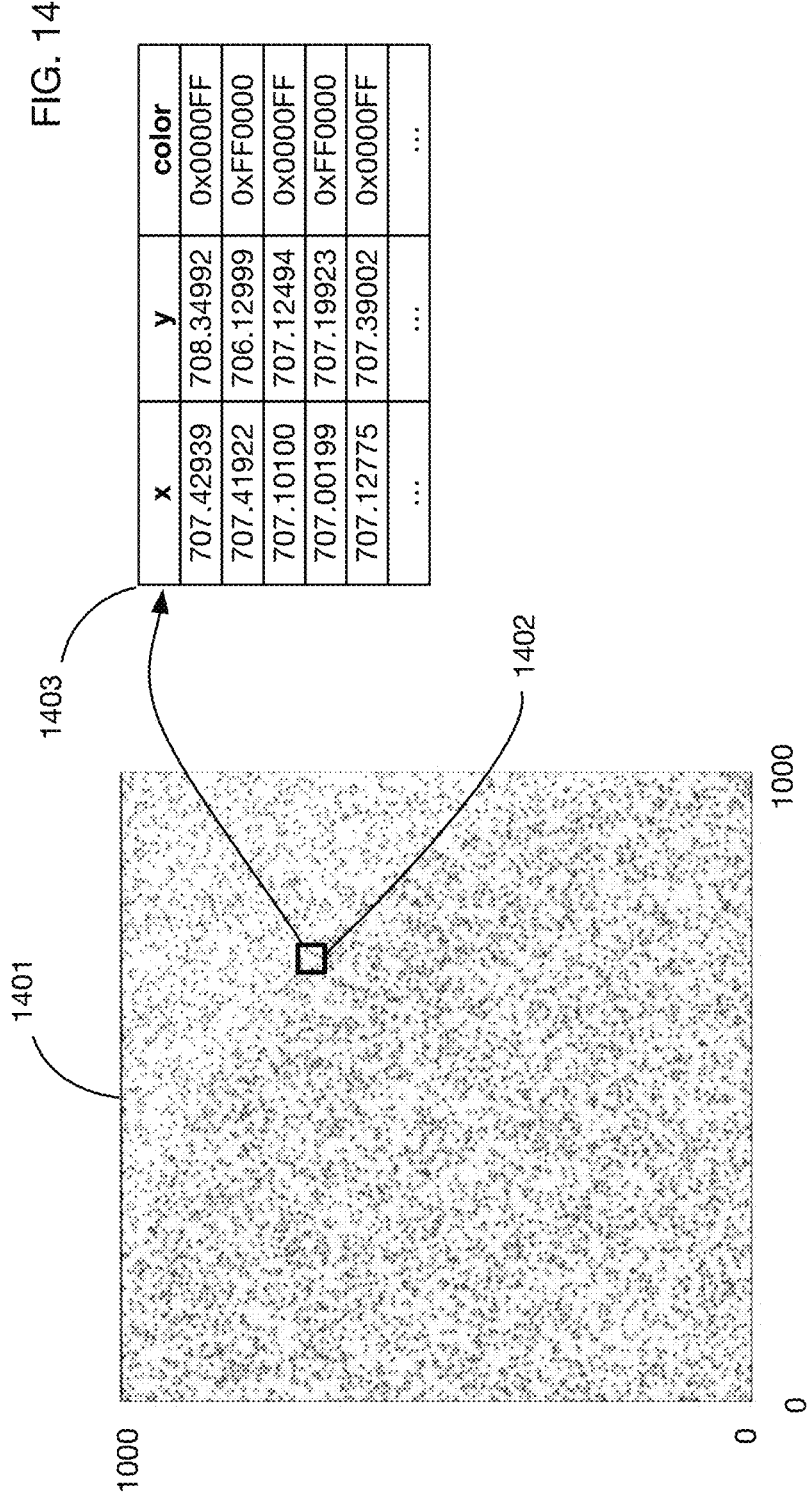

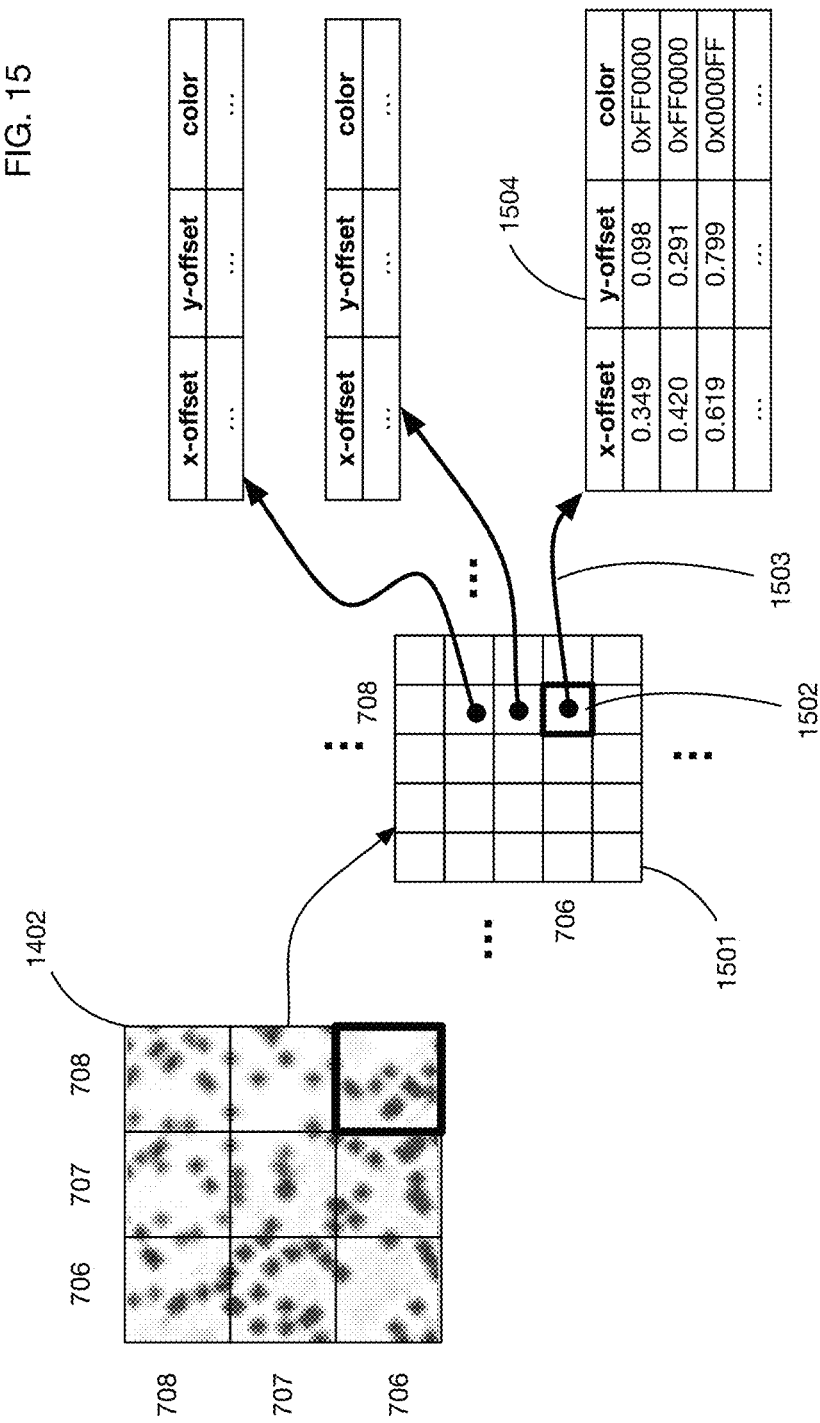

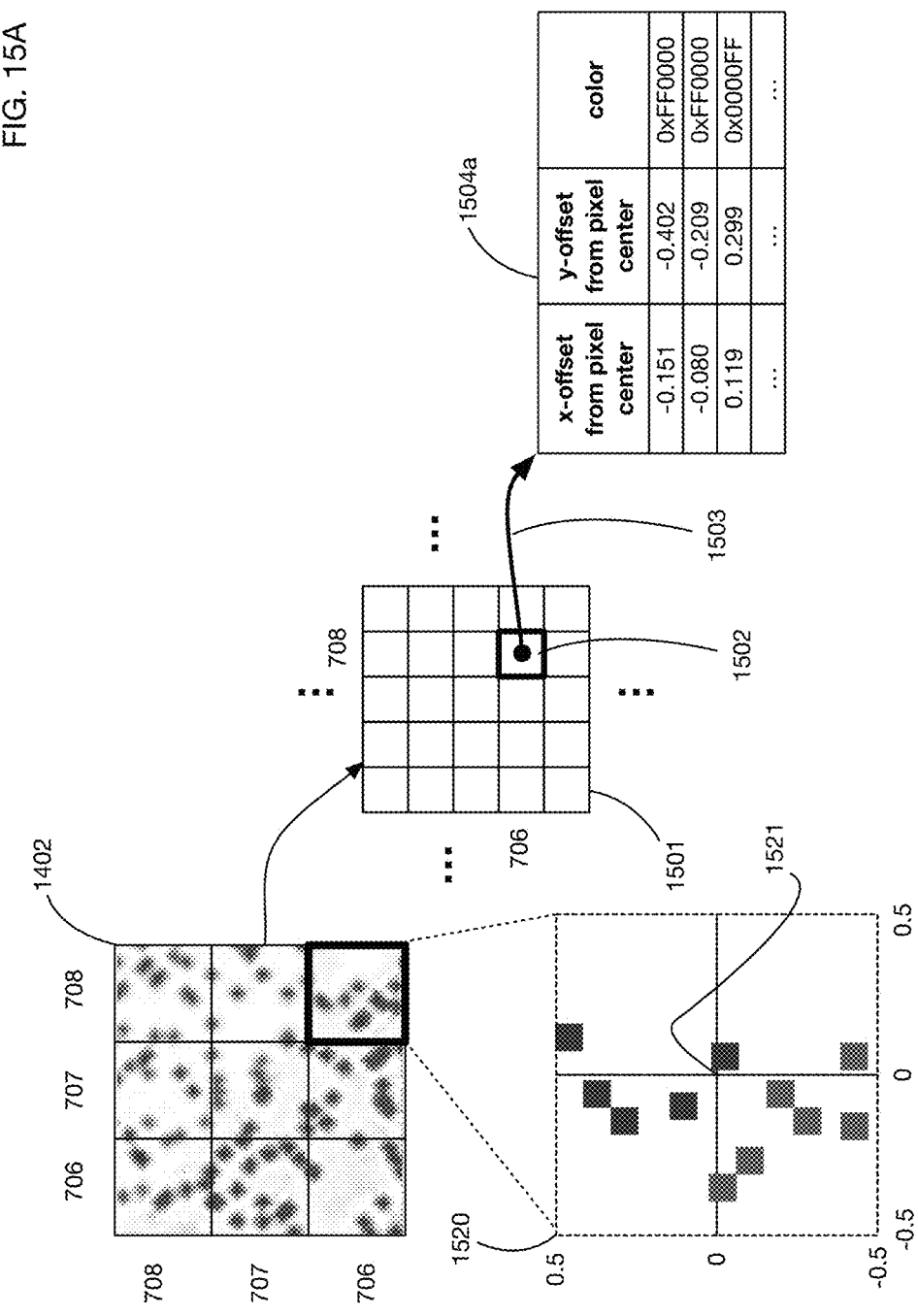

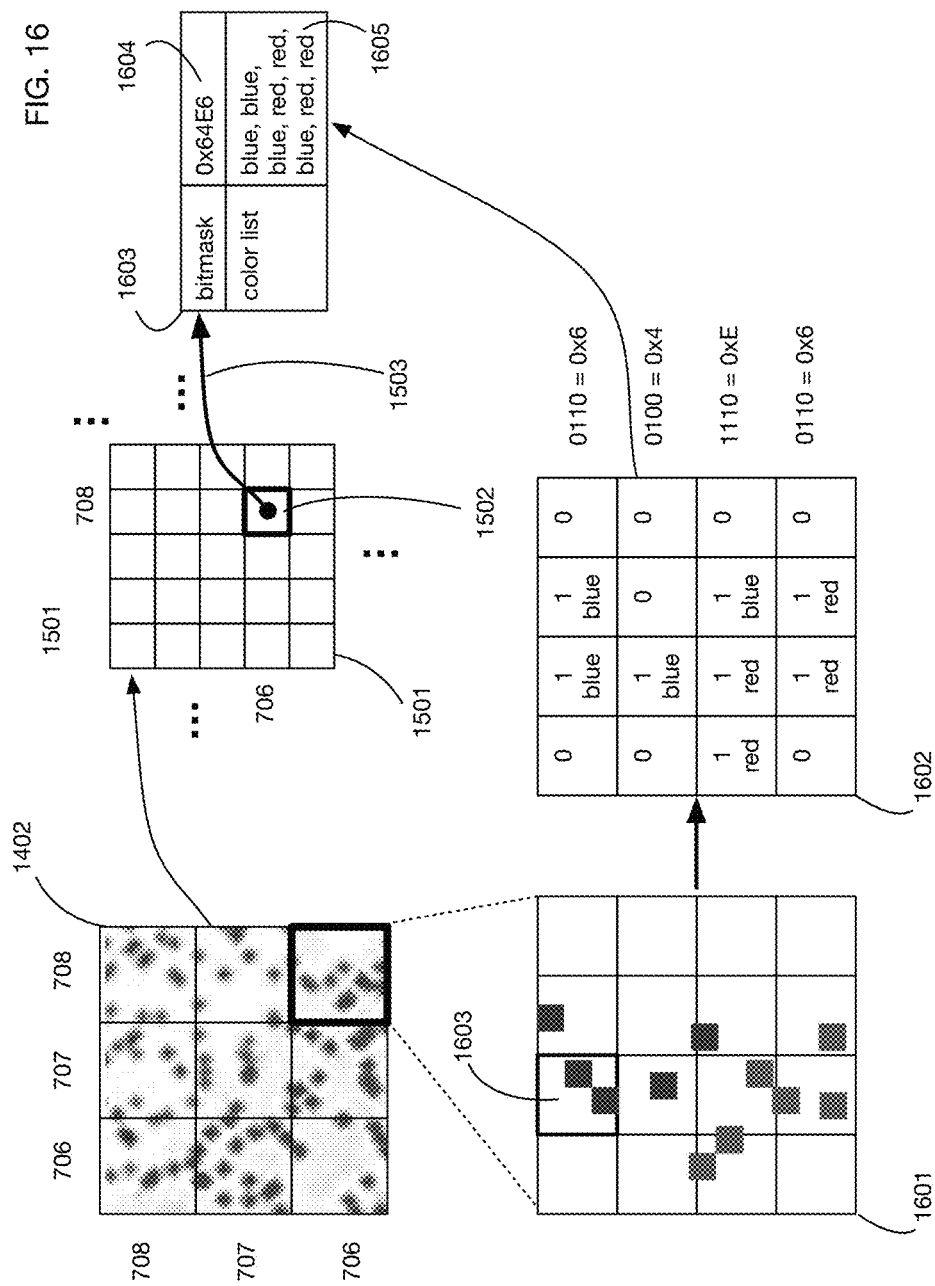

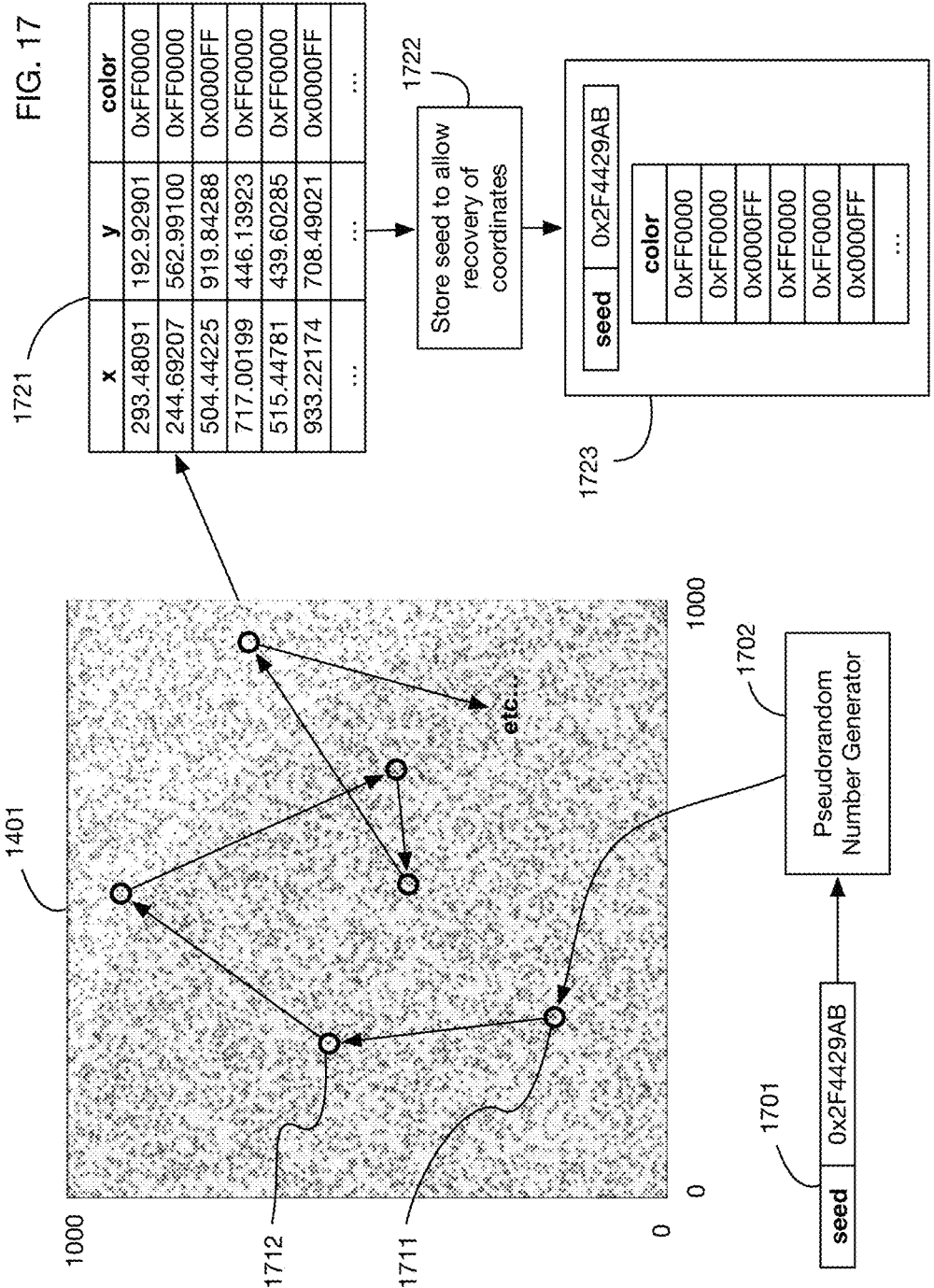

METHOD OF IMAGE COMPOSITING DIRECTLY FROM RAY TRACING SAMPLES

BACKGROUND OF THE INVENTION

Field of the Invention

One or more embodiments of the invention are related to the fields of computer graphics and image enhancement. More particularly, but not by way of limitation, one or more embodiments of the invention enable a method of image compositing directly from ray tracing samples.

Description of the Related Art

Image production pipelines, such as those employed in visual effects or computer graphics projects, often include compositing operations that manipulate images or frames. Illustrative compositing operations may for example modify the colors, appearance, visibility, or locations of elements within an image, or they may combine elements from different sources into a single image or frame sequence. Often a rendering stage precedes compositing; rendering may for example transform a three-dimensional model of a scene into one or more images that may then be manipulated via compositing operations. Rendering often uses ray tracing techniques, which simulate the path of light rays between the eye of the viewer of an image and the objects in a scene. The ray tracing renderer generates a large number of simulated light rays, and generates a ray tracing sample for the intersection of each ray with the objects in the scene. A ray tracing sample may for example include data on the identity of the object that the light ray hits, the location of the intersection, and the color at the point of intersection.

In traditional image production pipelines known in the art, rendering via ray tracing is followed by rasterization, which transforms the ray tracing samples from the renderer into a grid of pixels. The rasterized image (represented as pixels) then provides the input to the compositing stage of the pipeline. Compositing operations known in the art therefore manipulate the pixels of images that have already been rasterized.

A drawback of this existing process is that a large amount of information generated by the renderer is discarded when the renderer's output is rasterized into pixels. Compositing operations are therefore less effective and less flexible than they could be if they directly manipulated the renderer's ray tracing output. Historically, rasterization prior to compositing has been used because storage capacity and processing power were insufficient to support compositing directly from ray tracing samples. However, with current storage capacity and with the processing power available in graphics processing units (GPUs) and multicore CPUs, compositing directly from ray tracing samples becomes feasible. Compositing directly from ray tracing samples provides several benefits compared to compositing from rasterized images, since the ray tracing samples contain more information and are typically at a finer granularity For at least the limitations described above there is a need for a method of image compositing directly from ray tracing samples.

BRIEF SUMMARY OF THE INVENTION

One or more embodiments described in the specification are related to a method of image compositing directly from ray tracing samples. Embodiments of the invention enable compositing operations that directly access and modify data from a ray tracing renderer, prior to rasterizing an image into pixels. This approach contrasts with the typical workflow in the prior art, which rasterizes an image after rendering, and performs compositing operations on the rasterized image.

One or more embodiments of the invention may obtain ray tracing samples from a ray tracing renderer that renders a scene, and apply one or more compositing operations to these ray tracing samples. Each ray tracing sample may contain information associated with the intersection of a simulated light ray generated by the renderer with an object in the scene. This information may include for example, without limitation, the location of the point of intersection that generates the sample, the identity of the object intersected, and the color at that point. Location information may be for example two-dimensional or three-dimensional. In one or more embodiments, sample information may include any other data values generated by the renderer or otherwise generated or obtained.

After applying compositing operations directly to the ray tracing samples, the modified samples may be rasterized into a pixel image. Rasterizing may for example set the color of each pixel to a blend of the colors of the modified ray tracing samples within a pixel or near a pixel.

Ray tracing renderers may generate directions for simulated light rays in any desired patterns. These patterns may generate multiple samples per pixel. The number of samples per pixel may vary; for example, a renderer may generate more samples per pixel near object edges. One or more embodiments may obtain and manipulate ray tracing samples that are in an irregular, random, or pseudo-random pattern, rather than in a regular grid pattern; these irregular, randomized ray patterns are often used by ray tracing renderers to avoid rendering artifacts such as Moiré patterns.

One or more embodiments may perform any type or types of compositing operations directly on the ray tracing samples. For example, without limitation, compositing operations may include selection of one or more objects, which may select the ray tracing samples associated with these objects. Object selection therefore operates directly and immediately to select a corresponding set of samples, without the need for an object mask. Selected samples may be for example moved, rearranged, shown or hidden, or modified in color or texture. In one or more embodiments, compositing operations may include merging of ray tracing samples obtained from rendering of different scenes or different parts of a scene.

One or more embodiments may support compositing operations that reposition or rearrange objects in three-dimensional space. Sample locations may for example identify a three-dimensional point where a simulated ray intersects an object in a scene. Ray tracing samples may be manipulated as point clouds in three-dimensional space. Compositing operations may also include generating a modified image that represents the scene from a different viewpoint, which may be used for example to generate stereo images. Instead of rerendering an entire scene from a different viewpoint, one or more embodiments may reposition samples via compositing operations to reflect the modified viewpoint, and then request only those samples from the renderer that are needed to fill in missing background samples exposed by the new viewpoint. When repositioning objects in three-dimensional space via compositing operations on ray tracing samples, objects or parts of objects may become occluded by other objects even if they were not occluded in the original image. Compositing directly from ray tracing samples supports correctly rasterizing images to take into account these occlusion effects: for example, a sample may be ignored in rasterization if it is surrounded by or near other samples that are closer to the viewer.

After application of compositing operations to the ray tracing samples, the modified samples may be rasterized into one or more pixel images at any desired resolution, or at multiple resolutions. Resolution may be selected for example based on the resolution of a display on which the image will be shown, or based on a desired output resolution for storage or for transmission over a network.

During or after compositing, it may be desirable to generate preview images of the effects of the compositing operations. One or more embodiments may generate preview images using only a subset of the ray tracing samples, for example in order to generate these preview images more quickly or more efficiently. In one or more embodiments, a quality level for a preview image may be specified, which may for example affect how many samples per pixel are used to generate the preview image. A higher quality or full quality image may be generated in the background while a lower quality preview image is displayed, and may replace the lower quality preview image when it is ready. Generation of preview images or final images may be performed completely or in part using a graphics processing unit.

One or more embodiments may generate a mesh (or a set of meshes) from the composited ray tracing samples, instead of or in addition to generation of pixel images.

Compositing operations may access or manipulate any data values associated with ray tracing samples, including but not limited to color, location, and object identity.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of the invention will be more apparent from the following more particular description thereof, presented in conjunction with the following drawings wherein:

FIG. 1 shows a typical image processing pipeline known in the art, which rasterizes images into pixels prior to compositing.

FIG. 3 shows another variation of the pipeline of FIG. 2A, which also illustrates one of the potential benefits of compositing directly from ray tracing samples: pixel resolution may be selected after compositing, and images at different resolution may be generated to match display capabilities or other objectives.

FIG. 8 illustrates generation of a second viewpoint of an image using one or more embodiments of the invention. Since the modified viewpoint may expose new areas of the background that were not rendered for the original image, one or more embodiments of the invention may request new ray tracing samples for these areas and merge these samples with samples from the original image to form a second viewpoint image.

FIG. 9 illustrates a compositing operation using one or more embodiments of the invention that uses the three-dimensional location of ray tracing samples to determine when one object occludes another after a compositing operation changes the objects' relative location.

FIG. 10 illustrates a preview capability enabled by one or more embodiments of the invention, wherein a lower quality preview image may be generated relatively quickly using a subset of the ray tracing samples; a higher quality image may be generated in the background and displayed afterwards.

FIG. 10A illustrates another example of modifying image quality by varying the number of ray tracing samples used per pixel.

FIG. 11 illustrates generation of a mesh from the point cloud associated with the ray tracing samples.

FIGS. 12A and 12B show another example of generation of a mesh, for an object selected from the scene shown in FIG. 4.

FIG. 13 illustrates merging ray tracing samples obtained from different passes of a renderer to form a composited image.

FIG. 14 shows an example of the data associated with a sequence of ray tracing samples without any storage optimizations; this unoptimized data may require for example storing floating point values for the coordinates of each sample.

FIG. 15 illustrates a sample storage optimization that may be utilized in one or more embodiments, which stores coordinate offsets within each pixel, and which may truncate floating point precision.

FIG. 15A illustrates a variation of the optimization shown in FIG. 15, which stores offsets relative to a pixel center rather than a pixel corner.

FIG. 16 illustrates another sample storage optimization that may be used in one or more embodiments, which divides a pixel or a tile into subregions, and which uses a bitmask to indicate the presence or absence of a sample in each subregion.

FIG. 17 illustrates another sample storage optimization that may be used in one or more embodiments, which stores only the colors (and potentially other information such as object identity) associated with each sample, and stores the random seed used to generate the sample locations in order to reproduce those locations when needed.

DETAILED DESCRIPTION OF THE INVENTION

Figure 2A:
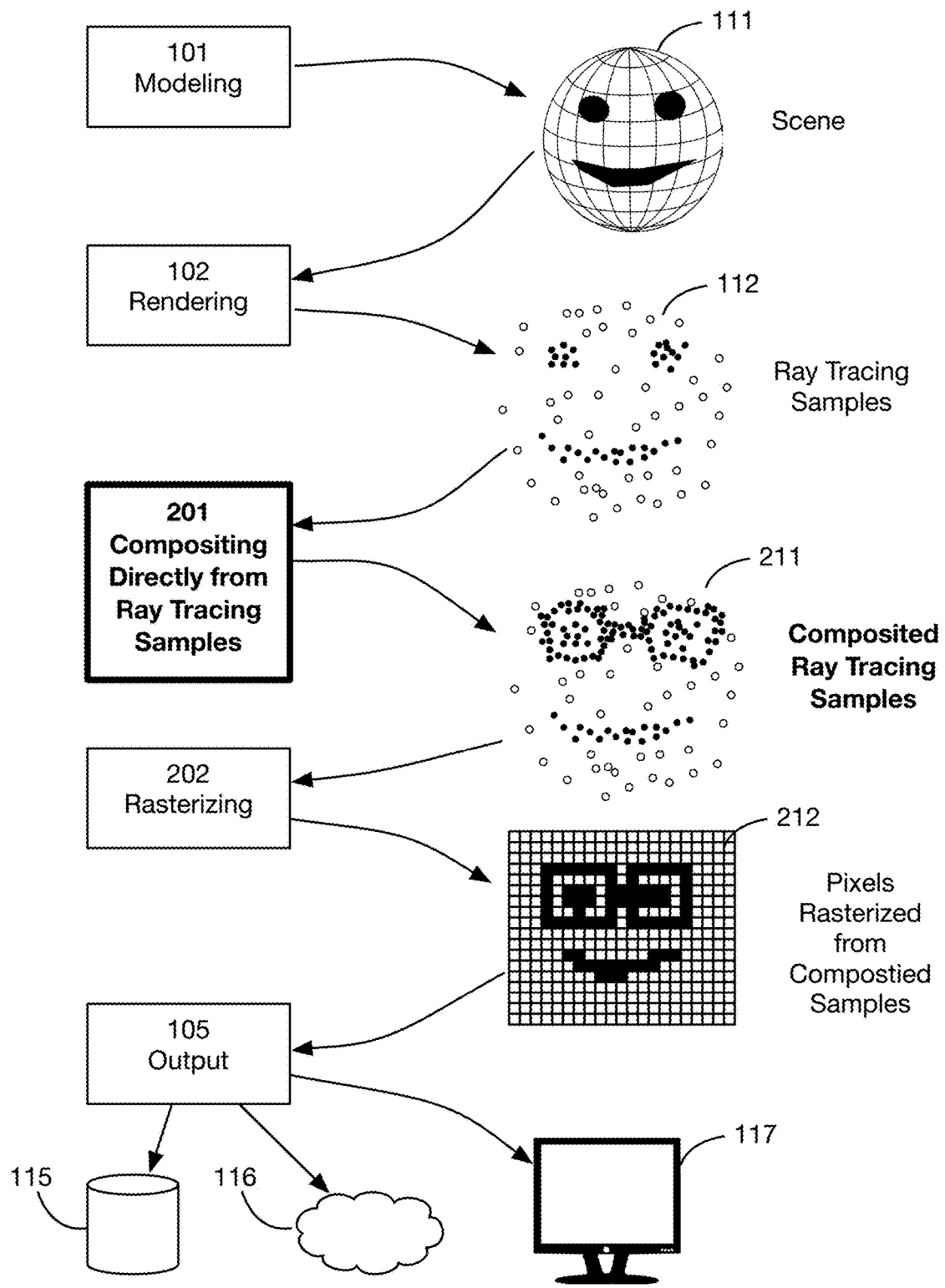
FIG. 2A shows a flowchart of one or more embodiments of the invention, wherein ray tracing samples generated by rendering are input directly into compositing, and images are rasterized into pixels after compositing.

A method of image compositing directly from ray tracing samples will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

FIG. 1 shows a typical image or video production pipeline employed in the existing art. A modeling process 101 creates a three-dimensional scene 111. This modeling process may for example include any or all of geometric modeling, texturing, lighting, rigging, and animating. The scene 111 is input into a rendering process 102, which renders the scene from one or more viewpoints. While multiple rendering techniques are known, current state of the art rendering often uses ray tracing. Ray tracing rendering software known in the art includes for example Vray®, Arnold®, Renderman®, Redshift®, and Octane®. In rendering process 102, the rendering software generates many simulated light rays that it traces from the viewpoint to one or more objects in scene 111. In many situations, multiple rays may be traced for each pixel of a target image. In some cases, the ray tracing renderer may send sometimes thousands of 'samples' into each pixel to help figure out what the color of that pixel should be. Each sample is a sort of "finger" that touches an object in the three-dimensional scene 111. If a sample ray hits a yellow object, for example, the sample will contribute that yellow to the pixel color. Rendering software may send hundreds of these fingers into the pixel because if it only sent one, it might not properly represent an average. For example, if half of the pixel was taken up by a yellow object and the other half a green object, if the software only sent one sample in, it may show the entire pixel as either yellow or green, rather than being a mix of both. To get a prosper mix showing the average of half green and half red, the renderer needs to send multiple samples into it. The more samples sent, the better and more accurate the average. All rendering software works this way, sending these samples into the pixel to get an average color of the pixel.

The output of the rendering process 102 is a set of ray tracing samples 112, each of which represents data on the intersection of a simulated light ray with one or more objects in scene 111. As described above, there may be multiple samples per pixel. The samples 112 are input into rasterizing process 103, which converts the samples into pixels 113. For example, the color of all of the samples within a pixel boundary may be averaged by the rasterizer to form the color of each pixel. A drawback of this rasterization prior to compositing is that all of the detail at the subpixel level that was generated by the renderer is lost during rasterization. For example, the rendering software may have calculated hundreds of samples in each pixel, but after rasterization the only information that remains is the average color per pixel. The rendering engine therefore generated potentially hundreds of times the data that is made available to compositing after rasterization 103.

In the traditional pipeline known in the art, pixels 113 are input into compositing process 104. Many types of compositing operations may be performed, such as for example, without limitation, changing colors, sizes, boundaries, textures, and shapes of objects; adding and removing objects; merging objects that may have been rendered from different scenes or different parts of a scene; and integrating computer generated elements with captured photographs or videos. In the traditional pipeline, these compositing operations are performed at the pixel level on rasterized image 113. The resulting compositing pixels 114 are then output 105, for example to a storage medium 115, to a network 116, or directly to a display 117.

FIG. 2A illustrates a pipeline enabled by one or more embodiments of the invention. This pipeline differs from that of FIG. 1 in that compositing operations 201 are performed directly on ray tracing samples 112. Compositing operations 201 generate composited ray tracing samples 211, rather than a modified pixel image as in the flowchart of FIG. 1. These composited ray tracing samples 211 are then input into rasterizing process 202, which occurs after compositing as opposed to prior to compositing as in FIG. 1. Pixels 212 are then output to process 105 to storage, network, or display as in FIG. 1.

Figure 2B:
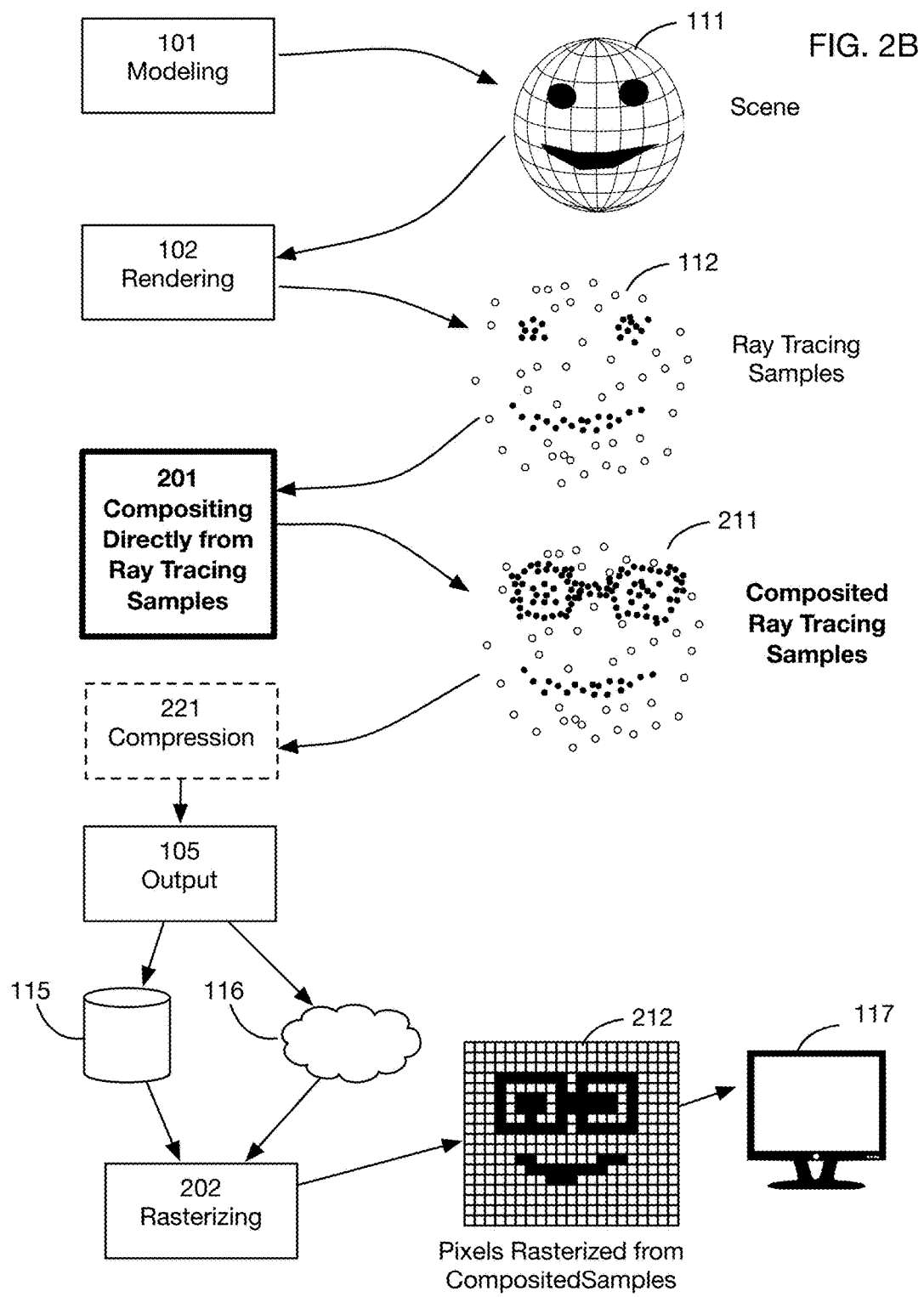
FIG. 2B shows a variation of the pipeline of FIG. 2A, where composited ray tracing samples are stored or transmitted (potentially after compression), and are rasterized thereafter at display time.

FIG. 2B illustrates a variant of the pipeline of FIG. 2A that may be used in one or more embodiments of the invention, wherein rasterization 202 is further postponed until after output 105. Specifically, composited ray tracing samples 211 may be output in process 105 to storage 115 or to a network 116, and then rasterized afterwards at display time to rasterized image 212 that is sent to display 117. Because in some situations there may be very many ray tracing samples 211 with very detailed information, in one or more embodiments there may be a further compression step 221 to compress the size of the ray tracing samples before output to storage or to a network.

FIG. 3 shows another variant of the pipeline of FIG. 2A, where a resolution selection step 301 may occur prior to rasterizing 202. The resolution may be selected for example by an operator, or it may be selected automatically to match for example the optimal or maximum resolution of an available display. Rasterizing 202 may therefore result in pixel images of varying resolution, such as for example medium resolution image 212, low resolution image 212a, and high resolution image 212b. This support for multiple resolutions is one potential benefit of compositing directly from ray tracing samples, since the high detail of these samples, which may be usable for higher resolution images, would otherwise be lost if the image is prematurely rasterized to a lower resolution (as in FIG. 1).

Figure 4:
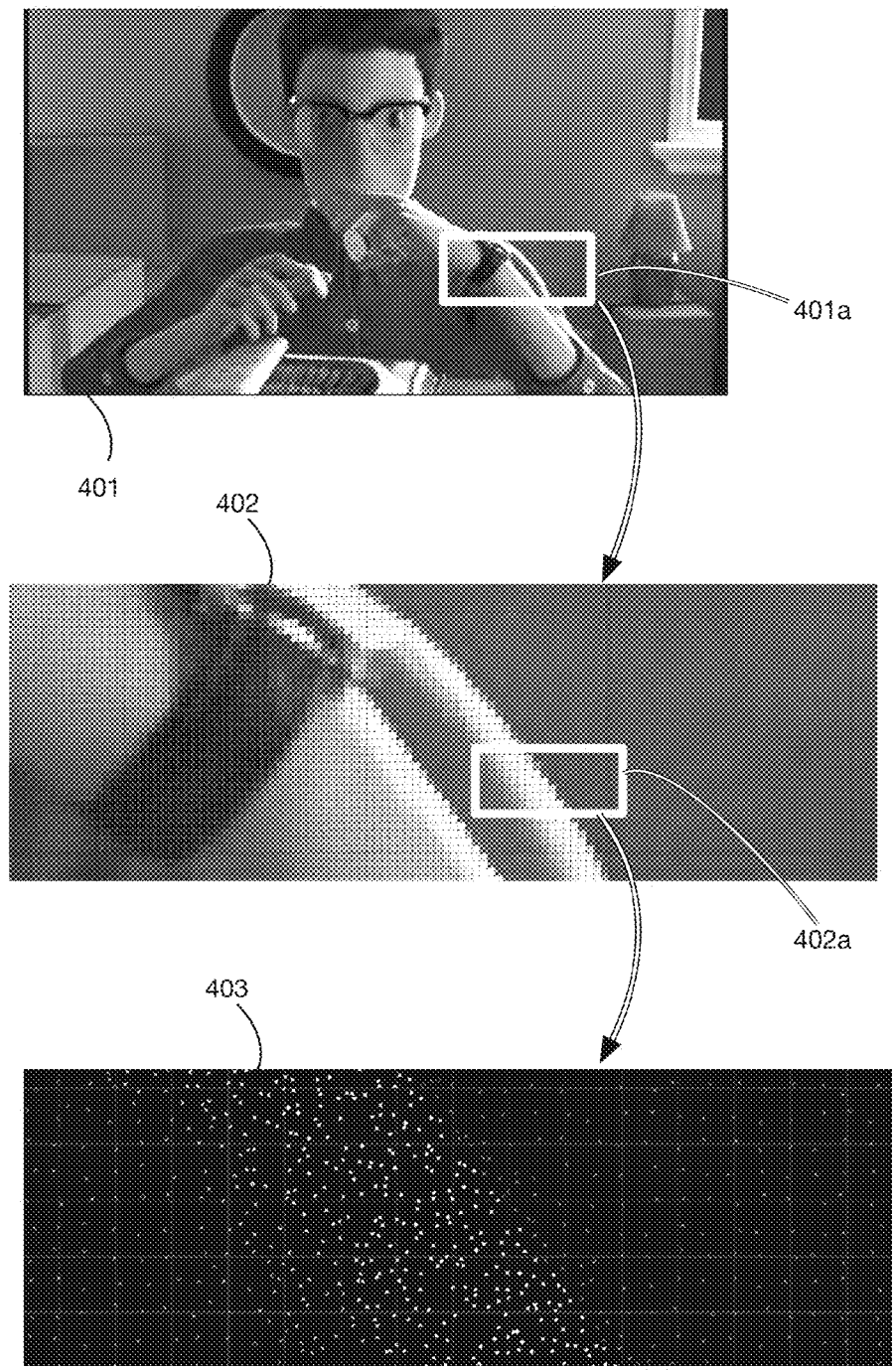
FIG. 4 shows an example of ray tracing samples generated by a ray tracing renderer; the illustrative ray tracing samples are at subpixel resolution, and are in an irregular pattern to prevent artifacts.
Figure 5:
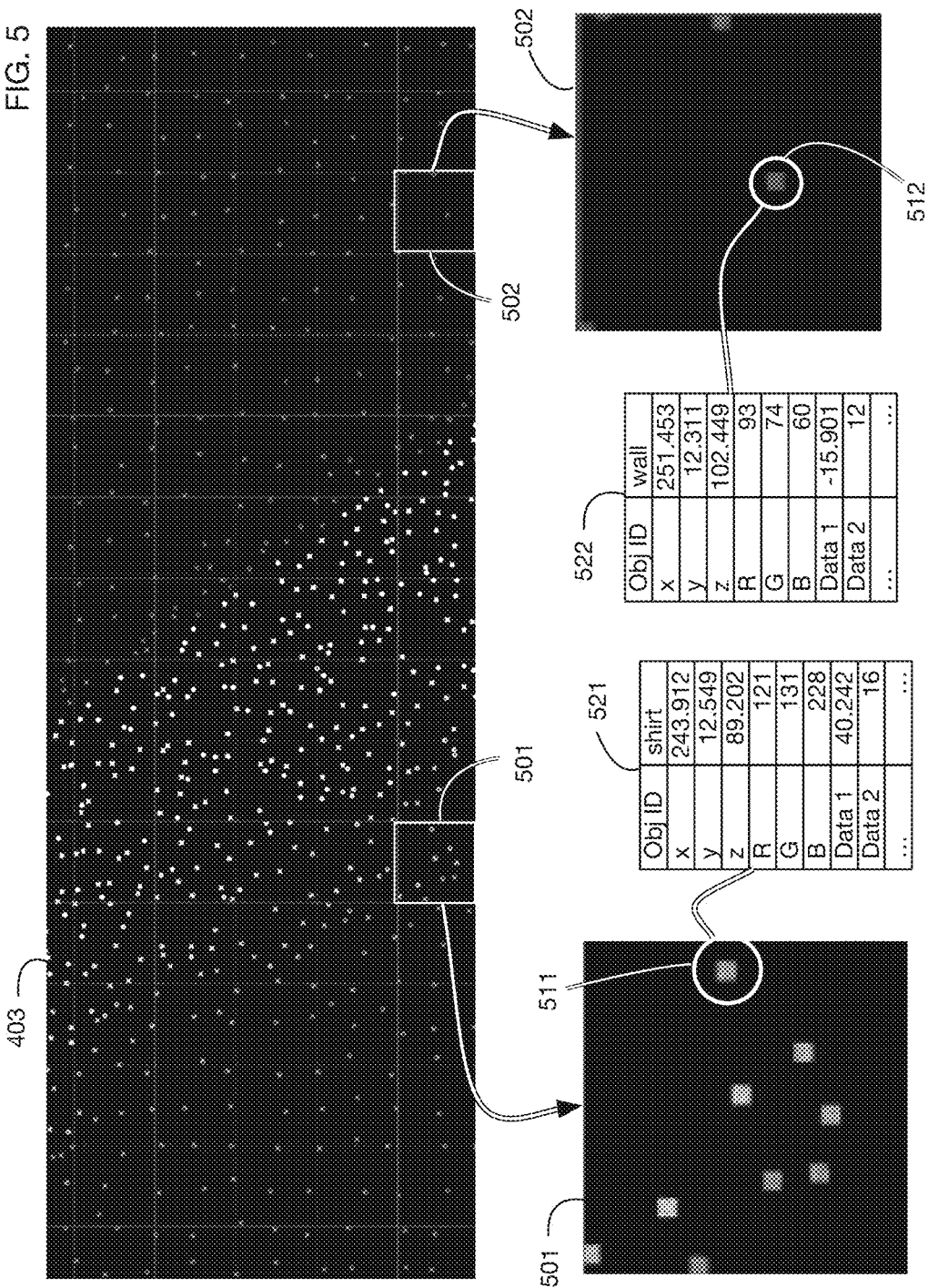
FIG. 5 continues the example of FIG. 4 to show individual ray tracing samples in two illustrative pixels, and to indicate the type of data that may be associated with a ray tracing sample.

FIG. 4 and FIG. 5 illustrate ray tracing samples generated for a realistic image. These figures also show the image and the ray tracing samples in color, which is a typical application. In FIG. 4, image 401 contains several computer modeled objects, such as a person with a shirt and a watch. Image 402 shows a close-up view of region 401a in image 401. A grid is overlaid onto image 402 to show potential pixel boundaries when image 401 is converted to a raster image. Image 403 is a further close-up view of region 402a of region 402. This image 403 shows individual ray tracing samples that were generated by a ray tracing renderer that rendered the scene 401. (Samples are shown as colored points; the black background represents areas without samples.) Each sample corresponds to a point in space where a simulated light ray intersects an object in scene 401. The color of the point corresponds to a color determined by the renderer for the intersection.

FIG. 5 continues a drill-down into the images of FIG. 4. Close-up views are shown of pixels 501 and 502 of region 403. Within each pixel there are multiple ray tracing samples. For example, sample 511 is shown within pixel 501, and sample 512 is shown within pixel 502. Associated with each sample is a data structure of sample information that is generated by the renderer for that sample. Sample information 521 for example is associated with sample 511, and sample information 522 is associated with sample 512. Sample information may include for example, without limitation: the identity of an object that the sample ray intersects; the location of the intersection, which may be a two-dimensional or three-dimensional point or may be coordinates in any desired coordinate system; the color of the point, which may be in RGB or any desired color space; and any auxiliary data corresponding to any values that the renderer may obtain or generate for the sample.

FIG. 5 illustrates an important characteristic of the ray tracing samples that may be obtained in one or more embodiments of the invention: the samples may be distributed irregularly across the pixels and irregularly within pixels. Different pixels may contain different number of samples; for example, pixel 501 contains 9 samples, and pixel 502 contains only 2 samples. Ray tracing renderers may vary the number of samples per pixel deliberately, for example in order to obtain greater detail at the edges of objects. The location of samples across and within pixels may also not follow any regular pattern or grid. Ray tracing renderers may deliberately generate randomized or pseudo-random ray directions and sample locations in order to prevent artifacts such as Moiré patterns. As a result, one or more embodiments of the invention are configured to obtain and manipulate ray tracing samples with irregular sample locations. This feature has important implications for the organization of sample storage, since samples are not aligned on a regular grid like pixels. This represents a significant different from the prior art that performs compositing operations on pixels, since images rasterized into pixels may be stored in regular arrays in memory or on disk. For ray tracing samples, more sophisticated storage and access methods are required since samples may be at any locations in any potentially irregular pattern across and within pixels.

Having obtained or received ray tracing samples such as for example those illustrated in FIG. 5, one or more embodiments of the invention may manipulate these samples via various compositing operations. These compositing operations may directly access and modify the samples, with rasterization occurring after compositing. This approach contrasts with the typical operations of compositing known in the art, which access and manipulate images at the level of pixels. We illustrate this contrast between the prior art and the invention with a specific compositing operation: selection of an object and modification of its color. This specific operation is illustrative; one or more embodiments of the invention may perform any desired compositing operation via direct access and manipulation of ray tracing samples.

Figure 6:
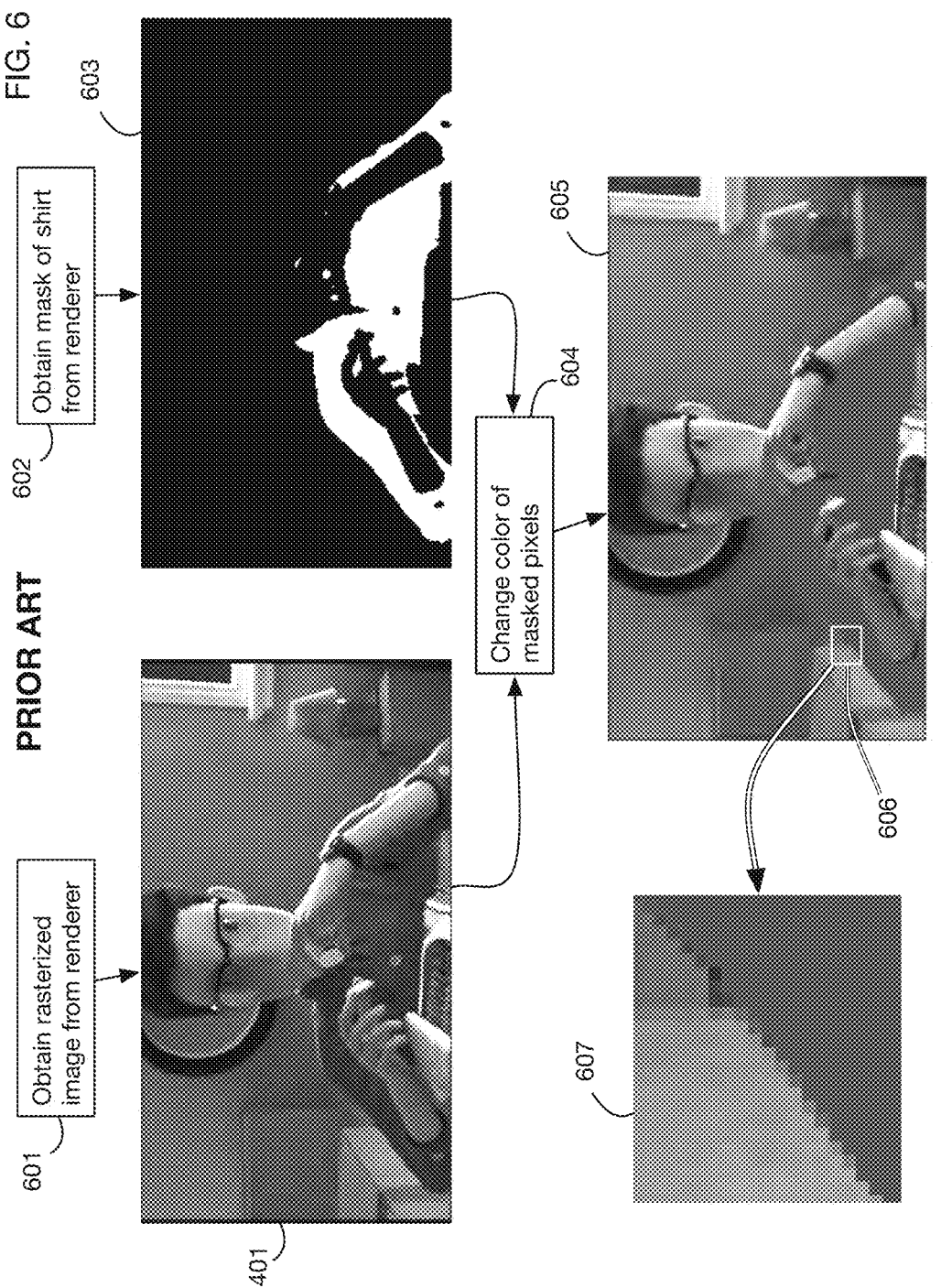
FIG. 6 shows an illustrative compositing operation using techniques known in the art: a specific object (a shirt) is selected via a mask, and the color of pixels within the mask is modified; this technique may result in unnatural edge effects since the detail of the ray tracing samples has been discarded by rasterizing prior to compositing.

FIG. 6 illustrates a method known in the art for this compositing operation. In step 601, the compositing subsystem obtains a rasterized image 401 from the renderer. For illustration, we show the operation of changing the color of the shirt in image 401. Because rasterized image 401 is simply an array of pixels, the shirt itself is not separately identified in the image. Therefore, to perform the color change operation, the compositing subsystem must obtain a list of the pixels associated with the shirt object, in step 602. This list of pixels associated with an object is typically obtained as a binary mask 603. Because the objects to be manipulated in compositing are not known in advance, a mask must generally be obtained for each operation via a request to the renderer to generate one or more object masks. This requirement for object masks when compositing from rasterized pixels requires additional time and processing, which is inefficient compared to directly manipulation of ray tracing samples as described below. After obtaining mask 603, the compositing subsystem performs operation 604 to modify the color of the masked pixels, resulting in modified rasterized image 605.

Image 607 is a close-up view of section 606 of modified rasterized image 605, after the compositing operation of changing the shirt's color. This image 607 illustrates another limitation of the prior art: when compositing from pixels, object edges become pixelated with an unnatural appearance. This artifact is apparent in image 607, which shows a very unnatural hard edge between the modified pixels of the shirt and the background. Ray tracing renderers typically generate multiple samples per pixel precisely to avoid this type of hard edge artifact; by blending multiple samples within a pixel at object edges, renderers may create more realistic looking edges without the pixelated appearance of image 607. However, because images have been rasterized prior to compositing (in the prior art), the information generated by the renderer is not available, and the natural appearance generated by the renderer is lost in compositing. While it is possible to compensate to some degree for these issues by applying additional pixel filtering operations in compositing, these compensating steps require additional work and do not yield optimal results.

Figure 7:
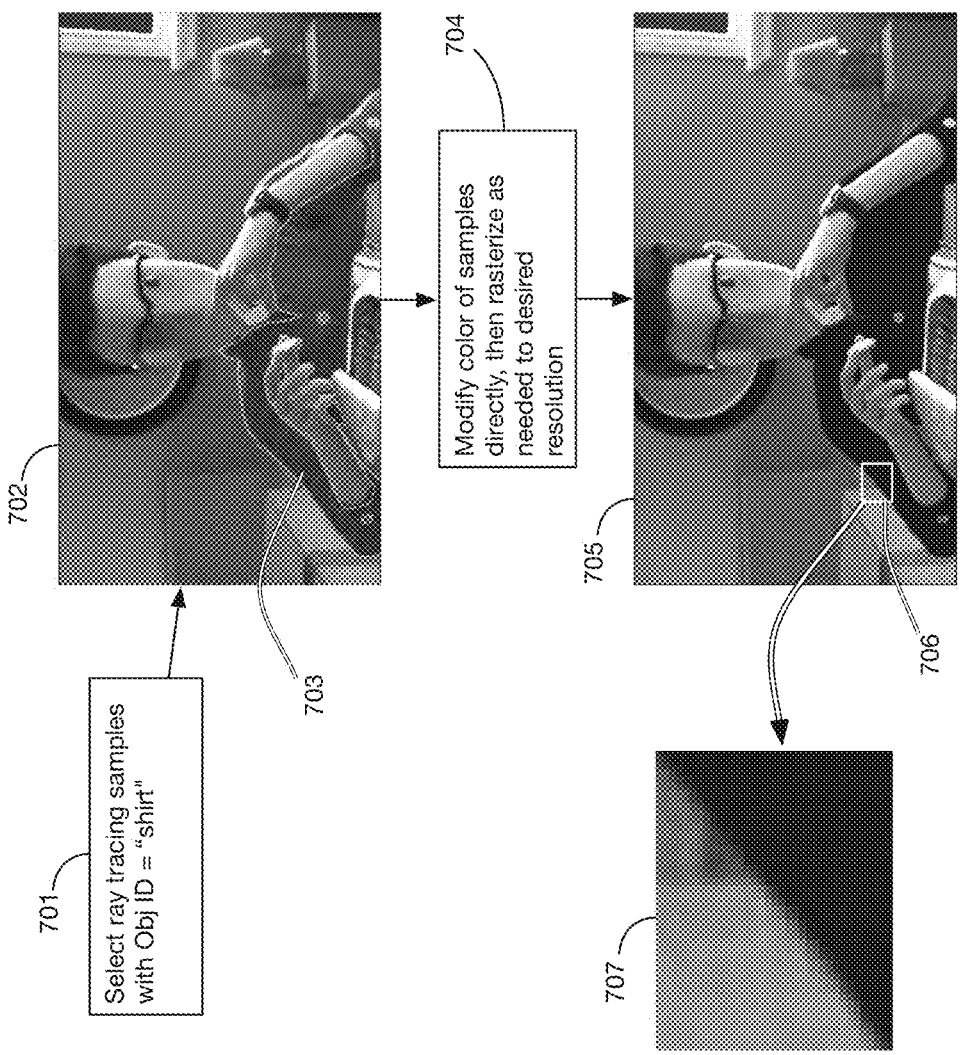
FIG. 7 illustrates how the color change compositing operation shown in FIG. 6 may be performed using one or more embodiments of the invention: ray tracing samples associated with the object are selected and are manipulated directly; this approach results in more natural edges since all of the ray tracing samples are employed in the compositing operation.

In contrast to the steps shown in FIG. 6, FIG. 7 illustrates a method that may be used in one or more embodiments to perform an object color change compositing operation. This method operates directly on the ray tracing samples obtained by the renderer. Because these samples may be tagged directly with the object identity associated with each sample, objects may be selected efficiently and directly in step 701, which in this example selects all ray tracing samples with an object identity matching the shirt. This selects a set of samples 703 in image 702. In contrast to the workflow of FIG. 6, no additional mask need be obtained from the renderer to select any object. In step 704, the compositing subsystem then directly modifies the color of the selected samples, resulting in modified image 705. Image 707 shows a close-up view of region 706 of image 704. In this case the edge between the shirt and the background retains a natural appearance with a soft boundary, in contrast to the hard, unnatural edge of image 607 of FIG. 6. This natural edge is possible because compositing retains all of the ray tracing samples for each pixel; hence the modified shirt samples may be blended with background samples at pixels on the edges.

While FIG. 7 illustrates a compositing operation of changing an object's color, one or more embodiments may apply similar methods to any desired compositing operation. Objects may be selected by selecting the samples tagged with the identity of the desired objects. Samples may then be manipulated in any desired manner. For example, without limitation, objects may be moved, resized, reshaped, recolored, retextured, hidden, or shown, by modifying the information associated with each ray tracing sample. Ray tracing samples from different renderings or different scenes may also be combined in any desired manner.

FIG. 8 illustrates another compositing operation that may be supported by one or more embodiments of the invention: generating an image from a different viewpoint. This operation may for example be useful in generating stereo images, or in converting images or videos from 2D to 3D. Although this operation may be performed by rerendering an entire scene from a different viewpoint, it may also be done in compositing by directly manipulating the samples, thereby avoiding a full rerendering. In step 801, ray tracing samples of image 401 are obtained from an original viewpoint. The compositing subsystem then performs step 802 to move the sample locations based on a second viewpoint, resulting in modified image 803. This transformation may expose areas of the background without samples, since these areas were occluded in the original viewpoint but are visible from the new viewpoint. Therefore, the system performs step 804 to identify missing background areas 805. To complete the generation of the new image from the new viewpoint, these missing background areas must be filled. In step 806, new samples in the missing areas are requested from the renderer, resulting in new samples 807, and in step 808 these samples are merged with the original image 401 to generate new image 809. Although it was necessary to invoke the renderer, the rendering process is limited to the small area 806 of missing background. Therefore, this process may be much more efficient than performing an entire rerendering from a second viewpoint.

The ray tracing samples accessed and manipulated by the compositing subsystem may have associated location information, which may for example include the three-dimensional position of the point in the scene where the sample was obtained by the renderer. With this three-dimensional information, the compositing subsystem may support repositioning of objects in three-dimensional space. This three-dimensional repositioning is difficult or impossible with traditional compositing software, since images are obtained as two-dimensional pixel arrays without three-dimensional spatial information. FIG. 9 illustrates a three-dimensional repositioning compositing operation supported by one or more embodiments of the invention. Scene 901 is input into rendering step 102, which generates ray tracing samples 902. The scene 901 consists of a blue sphere and a red cube. The rendered samples 902 are point clouds of samples, where each sample has a three-dimensional location. For example, sample 904a is a point of the cube, and sample 905 is a point of the sphere. In addition to the x, y, and z coordinates of each sample, the renderer associates an object identity and a color (and potentially other data values as well) with each sample. Operation 906 is then performed to select the cube and to move it to a different location in space; in this example, the cube is moved left and back, such that part of the cube is behind the sphere. This operation modifies the location data associated with samples of the cube; for example, sample data 904a is updated to data 904b, with modified x, y, and z values.

After the move operation 906, the point clouds for the cube and the sphere in modified samples 907 are overlapping in their x-y coordinates. Nevertheless, because the full three-dimensional position of each sample is retained, it is possible to rasterize these samples correctly to show the objects correctly from the perspective of the viewer in resulting image 909. In particular, considering sample 904b of the cube and sample 905 of the sphere, rasterizing operation 908 correctly shows the blue sphere in front of the red cube since the z value in sample 904b is greater than the z-value of sample 905. (Greater z values correspond to objects further away from the viewer in this example.) Compositing directly from ray tracing samples therefore allows objects to be repositioned in three-dimensional space without losing information. In contrast, this type of three-dimensional compositing is difficult or impossible in the prior art, since the two-dimensional pixel information available to the compositing subsystem does not retain three-dimensional data.

During compositing, it may be desirable to generate images frequently or repeatedly from the modified samples to view the effects of the compositing operations. Generating these images generally requires rasterizing the modified samples and transmitting the rasterized images to a display. With a large number of ray tracing samples, potentially hundreds per pixel, repeatedly rasterizing and displaying these images may be time-consuming and may introduce delays in the compositing process while an operator waits for an image to be displayed. Therefore, one or more embodiments of the invention may employ an optimization that generates preview images using a subset of the ray tracing samples. FIG. 10 illustrates this process. Ray tracing samples 907 have been modified by a compositing operation as described with respect to FIG. 9, and an operator for example wants to view the results. Region 1001 within the image shows a close-up view of the samples available, distributed across pixels. Many pixels contain multiple samples. To speed up generation of a preview image, step 1002 is performed to select a subsample of the samples and to use this subsample for the preview. For example, without limitation, a single sample per pixel may be selected to generate a preview. This approach is illustrated in image 1003, where a single sample per pixel is selected for the pixels in region 1001. One or more embodiments may select a subsample in any desired manner. For example, without limitation, samples may be selected randomly within or across pixels, a single or a small number of samples per pixel may be selected, or one or more samples within a pixel or region may be selected based on simplicity or speed of access (such as selecting the first sample in a list of samples within a pixel or region).

A preview image is then generated from the subsample. Image 1004 shows a portion of a preview image generated from the subsample 1003 corresponding to region 1001 of the full image. Because some of the samples in 907 are not used in generating preview 1004, artifacts are visible in the preview image. For example, pixel 1006 is red even though it is within the boundary 1005 of the blue sphere. Artifacts such as these may be acceptable as a tradeoff for rapid generation of preview images during compositing. In one or more embodiments, an operator or the system may be able to select a quality level for preview images, and may generate subsamples to correspond to the quality level. For example, a higher quality level may result in selection of more samples per pixel for a preview image, thereby reducing the number or severity of potential artifacts.

In one or more embodiments, a higher quality image or full quality image may be generated in the background while a lower quality preview image is displayed. Parallel generation of this image in the background may occur for example on one or more cores of a multiprocessor, or via graphics processing unit hardware. The system may swap out the preview image and replace it with the full quality or higher quality image when the background processing is complete. In FIG. 10, process 1010 occurs in the background (for example, on a graphics processing unit) and generates a full quality image 1011 from the full set of samples. When this image 1011 is available, it is displayed in place of or in addition to preview image 1004. One or more embodiments may generate multiple images in the background, for example at progressively higher levels of quality, and display each as it becomes available.

FIG. 10A shows another example of selecting an image quality by changing the number of samples used per pixel. User interface control 1021, which may for example be incorporated into a compositing subsystem, may be used to select the number of samples. In control 1021, the number of samples per pixel is set to 1; this results in image 1022, which has a grainy appearance. In control 1031, the number of samples per pixel is increased to 13, which results in a more natural image 1032 with a less grainy appearance.

In addition to or instead of generating a raster image from composited ray tracing samples, one or more embodiments may generate a mesh, for example using the samples as the vertices of the mesh. This is illustrated in FIG. 11, where step 1101 generates mesh 1102 from the ray tracing samples 902. The mesh 1102 may be used instead of or in addition to a pixel image. The mesh may for example be colored with the color of each vertex corresponding to the color of the sample. Separate meshes may be generated for different objects, as illustrated in 1102 where one mesh is generated for the sphere object and a different mesh is generated for the cube object.

FIGS. 12A and 12B illustrate generation of a mesh for an object from a realistic scene, specifically for the shirt object from the scene shown in image 401 of FIG. 4. The ray tracing samples obtained for a scene may have three-dimensional location information for each sample; this three-dimensional sample information allows the scene to be viewed from any perspective during compositing, as illustrated in FIG. 12A. Images 1201 and 1202 shows different views of the three-dimensional samples from the scene from image 401 in FIG. 4, as the viewpoint is rotated towards the left. These views may be generated for example using the preview procedures described above. FIG. 12B shows individual samples and a resulting mesh for a portion 1203 of the shirt object selected from the scene in compositing. The samples associated with any object may be selected directly since the sample information may include an object identifier. Samples from the shirt object are shown in 1211 (which corresponds to region 1203 of image 1202 in FIG. 12A), with 1212*b* showing a close-up view of portion 1212*a* of 1211. Mesh generation 1101 may be performed on these samples to generate a mesh 1221 for the shirt, with 1222*b* showing a close-up view of portion 1222*a* of this mesh.

One or more embodiments may support compositing operations that combine or merge ray tracing samples from different rendering passes. These passes may be different passes of a single scene, or they may be renderings of different scenes or different parts of a scene. Because one or more embodiments may obtain and access ray tracing samples directly, as opposed to compositing from rasterized pixel images, merging of samples is straightforward. For example, merging of samples may be performed as a simple union of the samples from different rendering passes. FIG. 13 illustrates an example. A scene containing a cube and a sphere 1301 is initially rendered by a ray tracing renderer. Image 1311 shows the samples obtained from the renderer for a single pixel 1302 of sphere 1301. In a different rendering pass, the renderer generates samples 1312 for the same pixel. For example, the second rendering pass may be requested to obtain more detail for the edge of the sphere. Combining the samples from these two rendering passes is achieved via a union of the samples 1311 and 1312, resulting in composited samples 1313. This straightforward compositing operation via a union of samples would not be possible with traditional compositing systems that operate on pixels rather than samples, since more complex and less accurate operations would be required to combine pixels from different rendering passes. Hence simple compositing of samples from different rendering passes represents a significant advantage of the invention over the prior art.

While compositing directly from ray tracing samples provides several benefits including the ones illustrated above, it poses a technical challenge in that much more information must be stored and accessed compared to compositing from rasterized pixels. Therefore, one or more embodiments of the invention may incorporate various optimizations for the storage, transmission, and retrieval of ray tracing sample data.

FIG. 14 illustrates the challenge of storing a potentially large number of ray tracing samples. Samples 1401 are generated by a ray tracing renderer, in this example in a pseudorandom pattern. Table 1403 shows illustrative samples within region 1402 of the image. For illustration, the x and y coordinates of the samples range from 0 to 1000 in this example. Because the samples are randomized and are not aligned on a regular grid, the precise location of each sample must be stored or must be otherwise available. Thus in table 1403, a floating point value for the x and y coordinates is stored for each sample, along with the color of the sample point. (As described above with respect to FIG. 5, there may be other information associated with each sample point, such as an object identity; for simplicity of illustration the data shown in table 1403 is limited to the x and y position of the sample and the sample color.) Because there may be potentially many samples per pixel, and hence potentially hundreds of millions of samples for an image, the storage of full floating-point values for location coordinates may generate enormous capacity requirements for memory, secondary storage, or network bandwidth. In contrast, storing rasterized pixel images is inherently compact, since pixels are arranged on a regular grid; hence a pixel image may be stored for example as a contiguous array of colors, with pixel coordinates defined implicitly by the offset position within the array.

FIG. 15 illustrates a storage optimization for the example of FIG. 14, which may be used in one or more embodiments of the invention. In this optimization, rather than storing full floating-point coordinates for each sample, the image is divided into tiles or pixels and locations are stored relative to the tiles or pixels. For example, region 1402 of the image may be divided into a 3 by 3 grid of pixels (or of tiles of any desired size), as shown in FIG. 15. Within each pixel or tile, the floating-point coordinates of each sample are translated relative to a corner of the pixel or tile. This reduces the absolute size of the coordinates, allowing them to be stored more compactly. Thus in FIG. 15, table 1501 corresponds to an array of pixels; each entry in the table such as entry 1502 may for example have a pointer 1503 to a table containing the sample data within the corresponding tile or pixel. The x-offset and y-offset values in table 1504 are therefore within the range of 0 to 1, requiring fewer digits and less storage space than the original x and y locations in table 1403 of FIG. 14.

FIG. 15 illustrates another storage optimization that may be used in one or more embodiments: sample locations or offsets may be stored in reduced precision. For example, the table 1504 retains only three decimal places of precision for offset values, compared to the original 5 decimal places of the sample locations illustrated in table 1403 of FIG. 14. One or more embodiments may represent locations or offsets in any desired manner, with any degree of precision or number of digits. For example, without limitation, 32-bit or 16-bit floating point values may be used instead of 64-bit double precision floating point values.

FIG. 15A illustrates a variation of the optimization scheme of FIG. 15; in this variation, sample location offsets are calculated relative to the center of a tile or pixel, rather than relative to a corner as shown in FIG. 15. For example, pixel 1520 has a coordinate system within the pixel with the origin at pixel center 1521. Offsets are thus reduced to the range −0.5 to 0.5 in table 1504*a*, which may further reduce storage requirements compared to offsets in the range 0 to 1. One or more embodiments may use any desired coordinate system or reference frame within a pixel or tile to represent sample location offsets.

FIG. 16 shows another optimization technique that may be used in one or more embodiments. In this optimization, pixels or tiles are divided into a grid of subregions, and sample locations are indicated by the grid position within the subregion. Furthermore, by combining samples within a subregion, sample data may be represented very compactly via a bitmask that shows which subregions have samples. For example, pixel 1601 in FIG. 16 is divided into a 4 by 4 grid of subregions. Some of these subregions have one or more samples; others have no samples. For each subregion, the presence of one or more samples is indicated by a "1" in a corresponding bitmask, and the absence of any samples in the subregion is indicated by a "0" in the bitmask. If there are multiple samples in a subregion, such as the two samples in subregion 1603 of pixel 1601, these samples are combined. Thus table 1602 contains the compressed sample information for pixel 1601. This data may be represented compactly as data structure 1603 associated with table entry 1502 corresponding to pixel 1601. Data structure 1603 has a 16-bit bitmask 1604 (which may be represented for example as 4 hexadecimal digits), and a list 1605 of the colors associated with those subregions that contain one or more samples.

FIG. 17 illustrates another storage optimization method that may be used in one or more embodiments of the invention, which stores a seed value that may be used to regenerate sample locations. Ray tracing renderers may for example use a pseudorandom number generator 1702 (for example for a Monte Carlo sampling procedure) to generate sample locations. A seed value 1701 may be provided to the pseudorandom number generator 1702 to initialize a sequence of pseudorandom values. If the same seed is provided subsequently to the generator 1702, the generator will regenerate the same sequence of values. This property allows for extremely compact storage of the sample locations, since only the seed value need be stored rather than the generated locations. For illustration in FIG. 17, generator 1702 generates a sequence of locations in image 1401, beginning with location 1711 and then location 1712. (Only a few locations are shown, but many thousands or millions of samples may be generated within image 1401.) Table 1721 shows the generated locations and corresponding colors obtained by the ray tracing renderer. Instead of storing this table directly, one or more embodiments may perform optimization 1722 to store data structure 1723, which contains the seed value 1701 along with the sequence of colors obtained from table 1721. The sample locations in table 1721 may then be recovered as needed from data structure 1723 by providing the seed value to the corresponding generator 1702, or to another generator instance that implements the same pseudorandom number generation algorithm.

A variation of this scheme that may be used in one or more embodiments is to use a different seed for each tile or pixel of an image, and to store the per-tile or per-pixel seeds, along with the colors (and other information such as object identity) obtained by the ray tracing renderer.

The storage optimization illustrated in FIG. 17 may also be used in one or more embodiments as a data security mechanism to protect the ray tracing samples from unauthorized access. For example, if an attacker obtained data structure 1723, he or she would be unable to reproduce the samples 1401 unless he or she also had access to the corresponding pseudorandom number generator 1702 that generated sample locations. The color list of 1723 by itself is insufficient to reproduce the image 1401. Even if the attacker had access to the generator 1702, the seed 1723 could be encrypted, again preventing reproduction of the samples. This security mechanism may have applications for example for rendering via cloud-based services. A studio for example may be reluctant to outsource rendering to a remote service because it may fear that the generated samples may be pirated. However, if the remote rendering service transmits only data structure 1723, and if the seed is encrypted or the pseudorandom number generator is kept private, then an attacker who obtained the data structure would be unable to reproduce the samples.

While the invention herein disclosed has been described by means of specific embodiments and applications thereof, numerous modifications and variations could be made thereto by those skilled in the art without departing from the scope of the invention set forth in the claims.

What is claimed is:

1. A method of image compositing directly from ray tracing samples, comprising:
    obtaining a plurality of ray tracing samples from a ray tracing renderer that renders a scene, each ray tracing sample of said plurality of ray tracing samples comprising
        a sample object identity of an object within said scene that intersects a ray associated with said ray tracing sample;
        a sample color; and,
        a sample location;
    applying one or more compositing operations to modify said plurality of ray tracing samples to form composited ray tracing samples;
    rasterizing said composited ray tracing samples into a composited image comprising a plurality of pixels after said applying said one or more compositing operations;
    generating a preview image from said composited ray tracing samples,
        wherein said generating said preview image comprises
            selecting a subset of said composited ray tracing samples; and,
            rasterizing said subset of said composited ray tracing samples into said preview image;
    displaying said preview image;
    generating a higher quality preview image from a larger subset of said composited ray tracing samples using a background process while said preview image is displayed; and,
    displaying said higher quality preview image when said background process is complete.

2. The method of claim 1 wherein said rasterizing said composited ray tracing samples comprises:
    setting a color of each pixel of said plurality of pixels to a blend of sample colors of said composited ray tracing samples comprising sample locations within said each pixel or near said each pixel.

3. The method of claim 1 wherein said obtaining said plurality of ray tracing samples comprises:
obtaining two or more ray tracing samples at different sample locations within at least one pixel of said plurality of pixels.

4. The method of claim 3 wherein said obtaining said plurality of ray tracing samples further comprises:
obtaining a non-constant number of ray tracing samples per pixel across said plurality of said pixels.

5. The method of claim 4 wherein said obtaining said plurality of ray tracing samples further comprises:
generating via said ray tracing renderer, a direction for said ray associated with each said ray tracing sample using a randomizing or pseudorandom procedure; and,
associating said sample location of each said ray tracing sample with said direction for said ray.

6. The method of claim 1 wherein said applying one or more compositing operations comprises:
selecting one or more selected objects within said scene; and,
selecting a subset of said plurality of ray tracing samples, wherein samples in said subset comprise a sample object identity corresponding to said one or more selected objects.

7. The method of claim 6 wherein said applying one or more compositing operations comprises:
modifying said sample color of one or more ray tracing samples of said subset.

8. The method of claim 6 wherein said applying one or more compositing operations comprises:
modifying said sample location of one or more ray tracing samples of said subset.

9. The method of claim 1 wherein said applying one or more compositing operations comprises:
merging said plurality of ray tracing samples with a second set of ray tracing samples obtained from rendering of all or a portion of a second scene.

10. The method of claim 1 further comprising:
obtaining a three-dimensional point in said scene from said sample location wherein said ray associated with said ray tracing sample intersects said object.

11. The method of claim 10, wherein said applying one or more compositing operations comprises:
requesting missing background ray tracing samples when generating a second viewpoint.

12. The method of claim 10, wherein said applying one or more compositing operations comprises:
selecting one or more selected objects within said scene;
selecting a subset of said plurality of ray tracing samples, wherein samples in said subset comprise a sample object identity corresponding to said one or more selected objects;
modifying a three-dimensional position of said one or more selected objects in said scene; and,
updating said sample location of ray tracing samples in said subset based on an updated three-dimensional position of said one or more selected objects in said scene.

13. The method of claim 12, wherein said rasterizing said composited ray tracing samples comprises:
setting a color of each pixel of said plurality of pixels to a blend of sample colors of said composited ray tracing samples comprising sample locations within said each pixel or near said each pixel and comprising three-dimensional positions that are not occluded by other composited ray tracing samples within said each pixel.

14. The method of claim 1, further comprising:
selecting a pixel resolution for said composited image before said rasterizing said composited ray tracing samples into said composited image.

15. The method of claim 14, wherein said selecting said pixel resolution for said composited image comprises:
determining a display resolution of a display on which said composited image will be displayed.

16. The method of claim 14, wherein said selecting said pixel resolution for said composited image comprises:
determining an output resolution in which said composited image will be stored.

17. The method of claim 1, wherein said generating said preview image further comprises:
selecting a quality level for said preview image;
determining a target number of selected composited ray tracing samples per pixel corresponding to said quality level; and,
selecting said subset of said composited ray tracing samples based on said target number of selected composited ray tracing samples per pixel.

18. The method of claim 1, wherein said rasterizing said subset of said composited ray tracing samples is executed on a graphics processing unit.

19. The method of claim 1, further comprising:
generating a mesh from said plurality of ray tracing samples, wherein each vertex of said mesh corresponds to a ray tracing sample of said plurality of ray tracing samples.

20. The method of claim 1, wherein said each ray tracing sample of said plurality of ray tracing samples further comprises:
a sample data value.

21. The method of claim 20, wherein said applying one or more compositing operations comprises:
selecting one or more selected objects within said scene;
selecting a subset of said plurality of ray tracing samples, wherein samples in said subset comprise a sample object identity corresponding to said one or more selected objects; and,
modifying said sample data value of one or more ray tracing samples of said subset.

* * * * *